United States Patent [19]

Kovar et al.

[11] Patent Number: 5,264,534
[45] Date of Patent: Nov. 23, 1993

[54] ORIENTED SEMICRYSTALLINE POLYMER FILMS

[75] Inventors: Robert F. Kovar, Wrentham; Richard W. Lusignea, Brighton; R. Ross Haghighat, Acton, all of Mass.

[73] Assignee: Foster-Miller, Inc., Waltham, Mass.

[21] Appl. No.: 786,126

[22] Filed: Oct. 31, 1991

[51] Int. Cl.$^5$ .................. C08G 8/02; C08G 73/10; B29C 71/00

[52] U.S. Cl. .................................... 528/125; 528/128; 528/170; 528/172; 528/173; 528/176; 528/183; 528/185; 528/188; 528/220; 528/229; 528/350; 528/351; 528/353; 428/473.5; 264/165; 264/216; 264/237; 264/288.4; 264/289.3; 264/290.2; 264/346; 264/348

[58] Field of Search .............. 528/125, 128, 172, 353, 528/185, 170, 173, 176, 183, 220, 229, 350, 351; 428/473.5; 264/165, 216, 237, 288.4, 289.3, 290.2, 346, 348

[56] References Cited

U.S. PATENT DOCUMENTS

| | | | |
|---|---|---|---|
| 2,336,384 | 12/1943 | Baker et al. | 18/48 |
| 3,074,108 | 1/1963 | Wiley et al. | 18/14 |
| 3,296,352 | 6/1963 | Riggs | 264/290 |
| 3,619,461 | 11/1971 | Gay | 264/288 |
| 3,676,539 | 7/1972 | Fisher | 264/175 |
| 3,765,067 | 10/1973 | Fisher | 26/54 |
| 4,110,395 | 8/1978 | Akutin et al. | 264/210 R |
| 4,385,022 | 5/1983 | Rohn | 264/210.1 |
| 4,405,550 | 9/1983 | Hungerford | 528/353 |
| 4,426,486 | 1/1984 | Hungerford | 528/353 |
| 4,687,611 | 8/1987 | Sroog | 264/236 |
| 4,690,999 | 9/1987 | Numata | 528/353 |
| 4,788,098 | 11/1988 | Sado | 428/473.5 |
| 4,792,476 | 12/1988 | Numata | 428/473.5 |
| 4,820,791 | 4/1989 | Hergenrother | 528/353 |
| 4,822,451 | 4/1989 | Ouderkirk et al. | 156/643 |
| 4,839,232 | 6/1989 | Morita | 428/473.5 |
| 4,879,176 | 11/1989 | Ouderkirk et al. | 428/323 |
| 4,892,896 | 1/1990 | Wright | 523/300 |
| 4,959,440 | 9/1990 | Tamai | 528/125 |
| 4,960,556 | 10/1990 | Oehlenschlaeger et al. | 264/322 |
| 4,978,712 | 12/1990 | Bair et al. | 525/51 |
| 5,032,209 | 7/1991 | Shinbach et al. | 156/272.6 |
| 5,037,587 | 8/1991 | Suruwatari et al. | 264/22 |
| 5,049,347 | 9/1991 | Magill et al. | 264/280 |
| 5,053,180 | 10/1981 | Wang et al. | 264/290.2 |
| 5,064,697 | 11/1991 | Takiguchi | 428/473.5 |
| 5,115,090 | 5/1992 | Sachdev | 528/353 |
| 5,145,942 | 9/1992 | Hergenrother | 528/353 |

*Primary Examiner*—John Kight, III
*Assistant Examiner*—P. Hampton-Hightower
*Attorney, Agent, or Firm*—David G. Conlin; Linda M. Buckley

[57] ABSTRACT

Processes for producing oriented films of semicrystalline thermoplastic polymers, such as polyimides, and films produced thereby are disclosed. One process includes partial crystallization or imidization, orientation and further crystallization or imidization. Another process includes rendering a film of semicrystalline thermoplastic polymer amorphous, orienting the film and introducing crystallinity.

14 Claims, 27 Drawing Sheets 1,3-BIS (4-AMINOPHENOXY-4'-BENZOYL) BENZENE (1,3-BABB)

OXYDIPHTHALIC ANHYDRIDE (ODPA)

SYMMETRICAL BIPHENYL DIANHYDRIDE (S-BPDA)

BENZOPHENONE TETRACARBOXYLIC DIANHYDRIDE (BTDA)

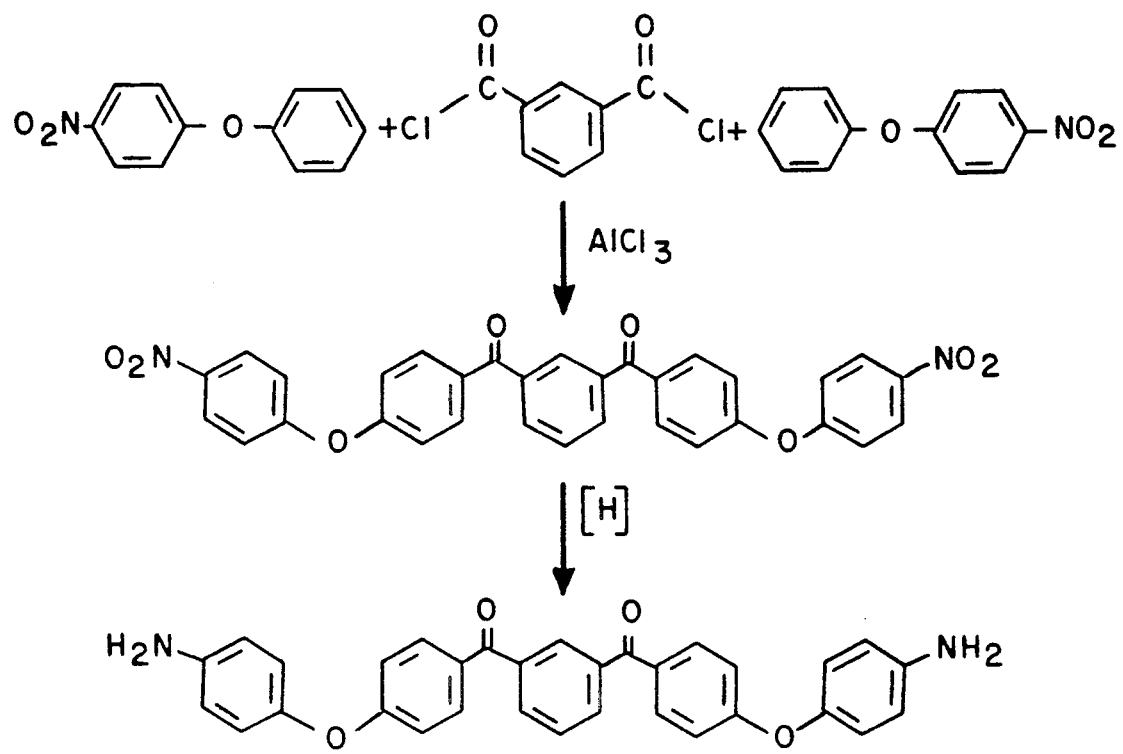
FIG. IC

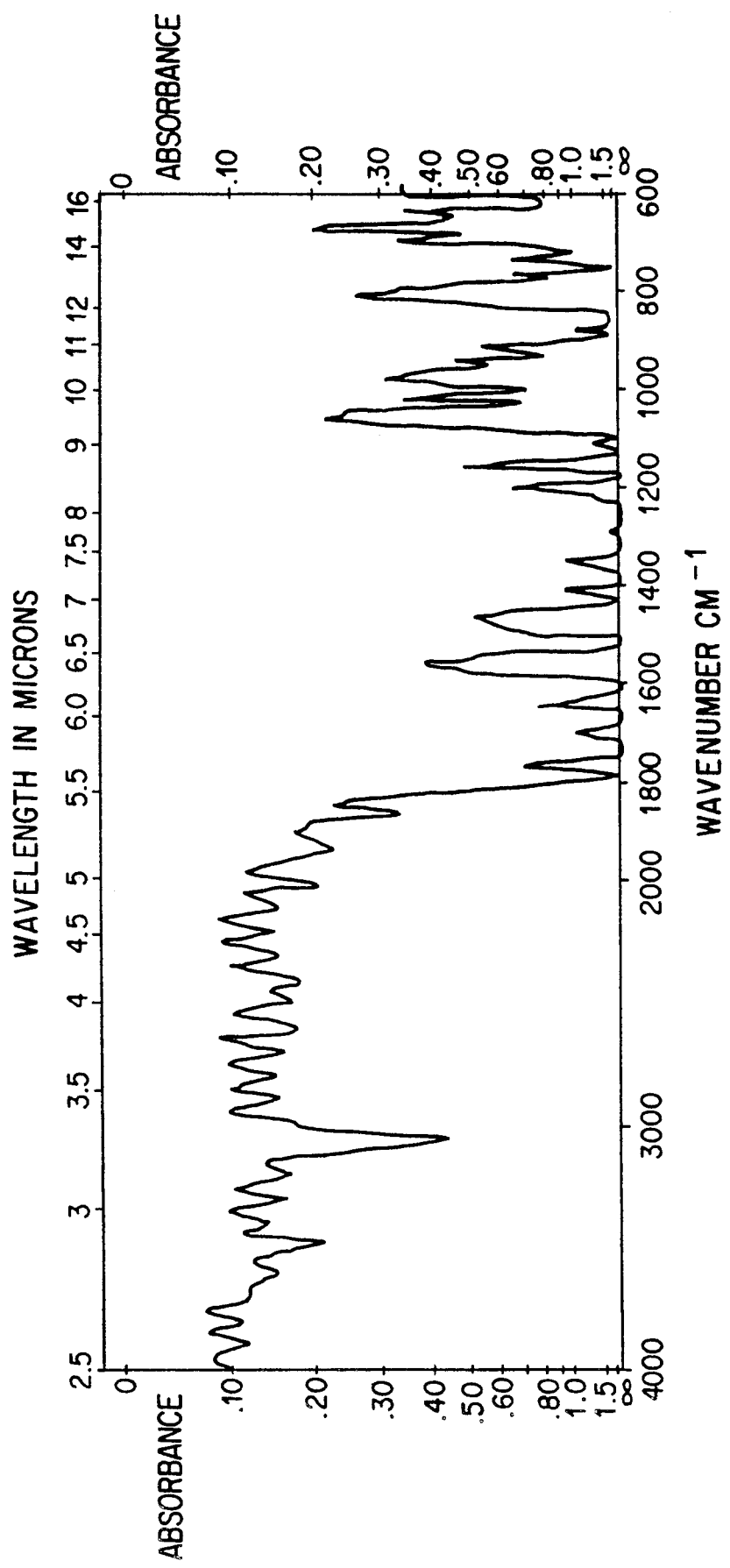

5,264,534

ORIENTED SEMICRYSTALLINE POLYMER FILMS

STATEMENT OF GOVERNMENT INTEREST

Funding for the present invention was obtained from the Government of the United States by virtue of Contract No. NAS1-18846. Thus, the Government of the United States has certain rights in and to the invention claimed herein.

BACKGROUND OF THE INVENTION

The present invention is directed towards methods of processing semicrystalline, thermoplastic polymers to provide oriented films and to films produced by such methods. In one aspect, an oriented film of semicrystalline, fully imidized thermoplastic polymer is provided.

Oriented polymers have numerous advantages over unoriented polymers in that they possess superior mechanical properties, such as higher strength, improved stiffness, increased toughness and so forth. Semicrystalline thermoplastic polymers have become recognized as attractive candidates for application in the aerospace and electronic industries, because of e.g., their combinations of tailorable properties such as orientation.

Semicrystalline thermoplastic polyimide materials are of a particular interest. However, difficulties in processing such polymers have limited their further application. One class of a semi-crystalline, thermoplastic polyimides developed by NASA Langley Research Center, LARC-CPI, is expected to produce oriented films with mechanical and chemical properties superior to Kapton, Upilix S and other commercially available films. However, film processing techniques that can exploit the thermoplastic and semicrystalline properties of polyimides, such LARC-CPI, and semicrystalline thermoplastic polymers in general are being sought.

SUMMARY OF THE INVENTION

The present invention provides oriented films comprising semicrystalline thermoplastic polymers and method of producing such films.

Suitable polymers for use in the practice of the present invention include those thermoplastic polymers, the crystallinity and/or imidization of which can be varied as a function of thermal treatment. These polymers will be hereinafter referred to as "semicrystalline thermoplastic polymers" and include aromatic: polyimides; polymers having imidizable groups; polyesters; poly ethers; poly ether-ketones (e.g.,PEEK, PEKK); poly ketones; poly sulfones; poly sulfides; polyquinoxalines; and polyquinolimines. Semicrystalline thermoplastic polyimides are particularly useful in the practice of the present invention. LARC-CPI polyimides are a preferred class of polyimides for use in the present invention and LARC-CPI-BTDA is a particularly preferred LARC-CPI polyimide.

The methods of the present invention provide greater control over the orientation process to provide oriented films having desirable physical properties, such as improved mechanical properties.

One method of the present invention involves the introduction of partial crystallinity into a film comprising a semicrystalline thermoplastic polymer or precursors thereof, followed by orientation of the film, and finally causing the oriented film to further crystallize. In some embodiments, it is desirable that in the second crystallization step the polymer reach its maximum degree of crystallinity to achieve maximum mechanical properties.

One such method comprises the steps of:
(a) partially crystallizing a film comprising a semicrystalline thermoplastic polymer or precursors thereof by thermal treatment;
(b) cooling the film of step (a) under conditions to inhibit further crystallization;
(c) orienting the film of step (b) at a temperature slightly above the glass transition temperature (Tg); and
(d) further crystallizing the film of step (c) by thermal treatment.

The present invention also provides methods of orienting semicrystalline thermoplastic films.

One such method comprises:
(a) heating a film comprising a semicrystalline thermoplastic polymer to render it amorphous;
(b) cooling the film of step (a) under conditions to keep the film amorphous;
(c) orienting the film of step (b) at a temperature slightly above the glass transition temperature (Tg); and
(d) crystallizing the film of step (d) by thermal treatment.

Steps (c) and (d) may be carried out simultaneously by selecting the appropriate processing conditions as is discussed below.

Some semicrystalline thermoplastic polymers suitable for use in the present invention undergo crosslinking and/or imidization. The crystallinity of such semicrystalline polymers is dependent, at least in part, upon the degree of crosslinking and/or imidization. For example, when oriented semicrystalline thermoplastic polyimide films are prepared in accordance with the teachings of the present invention, such films are both imidized and rendered semicrystalline. In such embodiments, the methods of the present invention may be considered in light of degree of imidization achieved.

One such method comprises:
(a) partially imidizing a film comprising polyamic acid precursor polymers by thermal treatment;
(b) cooling the film of step (a) under conditions to inhibit further imidization;
(c) orienting the film of step (b) at a temperature slightly above its Tg; and
(d) fully imidizing the film of step (c) by thermal treatment.

Imidization is preferably achieved through thermal treatment.

The present invention also provides methods of orienting films comprising fully imidized, semicrystalline polyimides.

One such method comprises:
(a) heating a film comprising imidized, semicrystalline polyimide to render it amorphous;
(b) cooling the film obtained in step (a) under conditions to inhibit crystallization;
(c) orienting the film of step (b) at just above the Tg; and
(d) crystallizing the film of step (c) by thermal treatment.

Steps (c) and (d) may be carried out simultaneously by selecting appropriate conditions as is discussed below.

The conditions under which the methods of the present invention are carried out are dependent upon the particular semicrystalline thermoplastic polymer being processed. These conditions can be readily determined in accordance with the teachings herein.

In some embodiments of the present invention, it is desirable to carry out the partial crystallization and/or imidization step in stages to produce films having better properties.

In general, the orientation step of the methods of the present invention is carried out at as low a temperature as it is possible to achieve the desired orientation and/or mechanical properties. This is typically just above, e.g., about 5° C. or less, the glass transition temperature (Tg) of the semicrystalline thermoplastic polymer being oriented.

The further crystallization or recrystallization steps of the methods of the present invention are, in some embodiments, carried out on oriented film which has been placed under stress or constraint, e.g., in a tenter frame.

Specific parameters that were applied to LARC-CPI-BTDA polymer to obtain the highest mechanical property film included:

Staged drying and partial imidization of LARC-CPI precursor films to 250° C. in air or inert atmosphere for 30 min duration;

Uniaxial and biaxial orientation of partially-imidized LARC-CPI precursor films to stretch ratios exceeding 3× biaxial (9× total) at stretch rates up to 6 in./sec using a T. M. Long stretcher apparatus as described in the examples; and Tentering of the stretched film within a tenter frame at a stress equal to 5 percent of its room temperature tensile strength and completing the film imidization process by heat-treatment at 300° C. The LARC-CPI oriented polyimide film process can be readily scaled up to produce continuous lengths of 35 wide, electronics grade film.

Table I illustrates properties that may be achieved for uniaxial and biaxially-oriented films comprising LARC-CPI-BTDA polyimides and prepared in accordance with the teachings of the present invention.

including solar concentrators and arrays, as well as in composite structures.

BRIEF DESCRIPTION OF THE FIGURES

FIG. 1C and 1D show the synthesis of 1,3 - BABB.

FIGS. 9A-9F show typical infrared spectrum obtained of LaRC-CPI films of the present invention, processed to various degrees of imidization.

FIG. 11 shows the DCS for semicrystalline LARC-CPI film of the present invention after 3 minutes of

TABLE I

MECHANICAL PROPERTIES FOR LaRC-CPI-BTDA POLYIMIDE FILM OBTAINED BY PARTIAL IMIDIZATION AT 250° C. (65 PERCENT IMIDIZATION)

| Film Orientation | Imidization Temp./ Time | Stretch Ratio | Tensile Strength (ksi) | Tensile Modulus (msi) | Elongation (%) | Anneal Temp/ Stress | Stretch Rate. in/sec |
|---|---|---|---|---|---|---|---|
| Unoriented (Control) | 250° C./ 30 min | 1x | 21.2 | 0.60 | 5.1 | 300° C./ 0.7 ksi | 0 |
| Uniaxial | 250° C./ 30 min | 4x | 61.1 | 1.2 | 7.6 | 330° C./ 0.7 ksi | 8 |
| Balanced | 250° C./ 30 min | 3x, ea (9x total) | 30.1 | 0.76 | 9.6 | 300° C./ | 5 |

It can be seen that LARC-CPI-BTDA film, when processed as taught herein, can be improved significantly in tensile strength, modulus and CTE behavior. For example, tensile strength and modulus were increased from 21 ksi and 0.6 msi, respectively, to 61 ksi and 1.2 msi, respectively, by uniaxial orientation of partially-imidized LARC-CPI-BTDA film.

A number of important applications exist for oriented LARC-CPI films. Aerospace structures are one such application. LARC-CPI films processed in accordance with the present invention will find widespread use in spacecraft as, e.g., laminate materials for flat panels, heating at 400° C. to yield a totally amorphous film.

Figure 12:
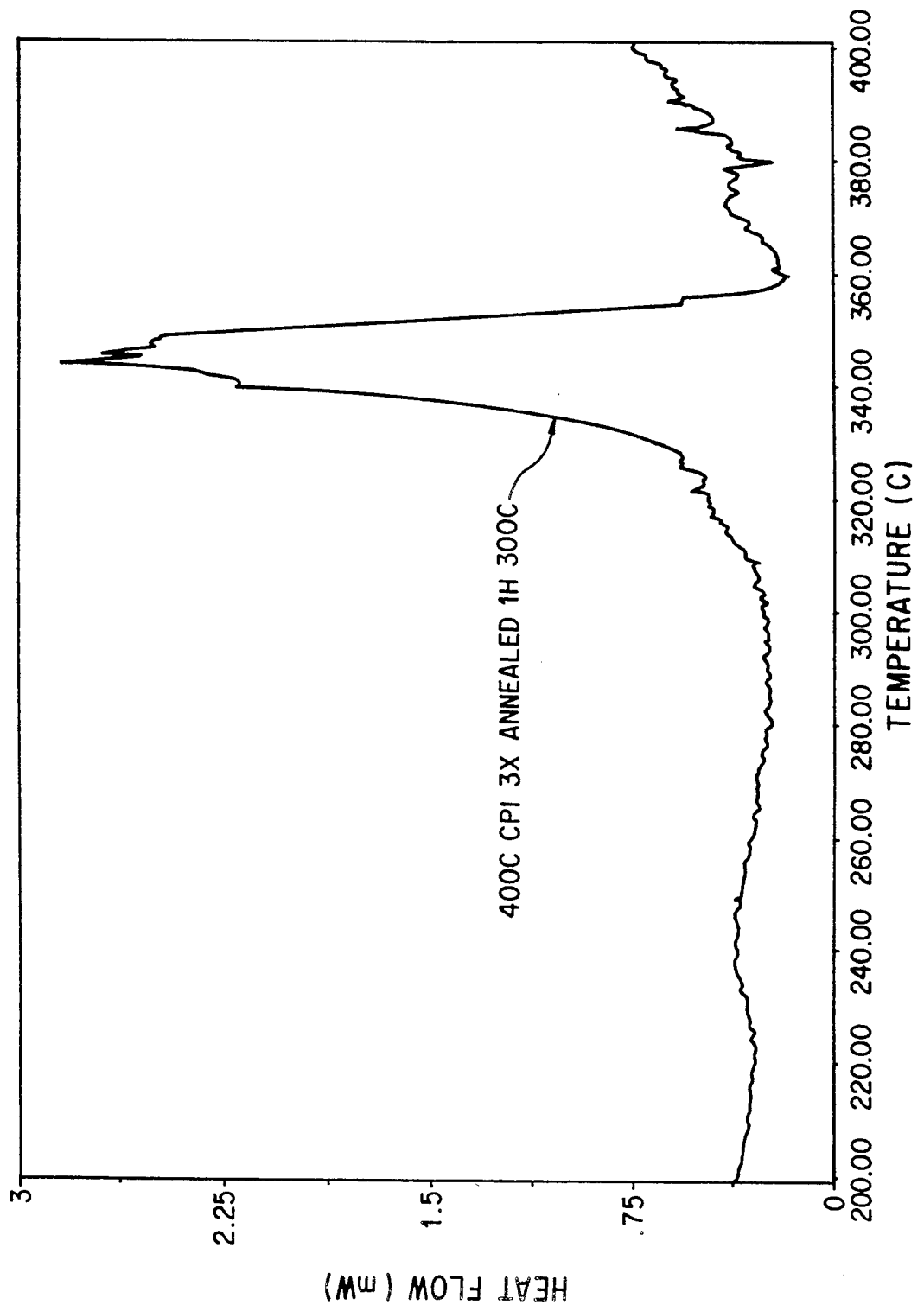

FIG. 12 is a thermogram for LARC-CPI-BTDA of the present invention quenched to amorphous, stretched and annealed.

Figure 13:
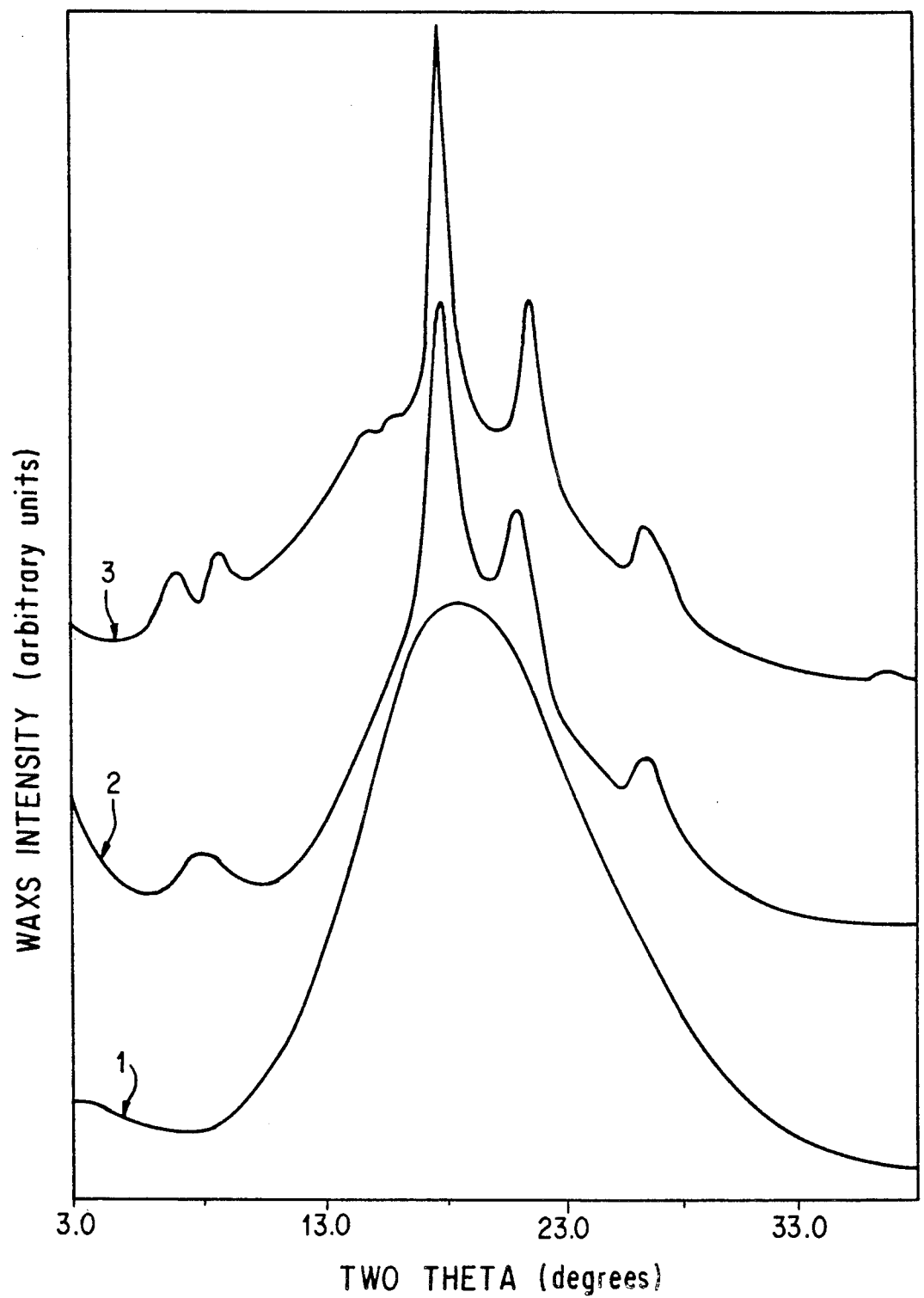

FIG. 13 shows a WAXS for LARC-CPI-BTDA films of the present invention with different thermal treatments.

Figure 14:
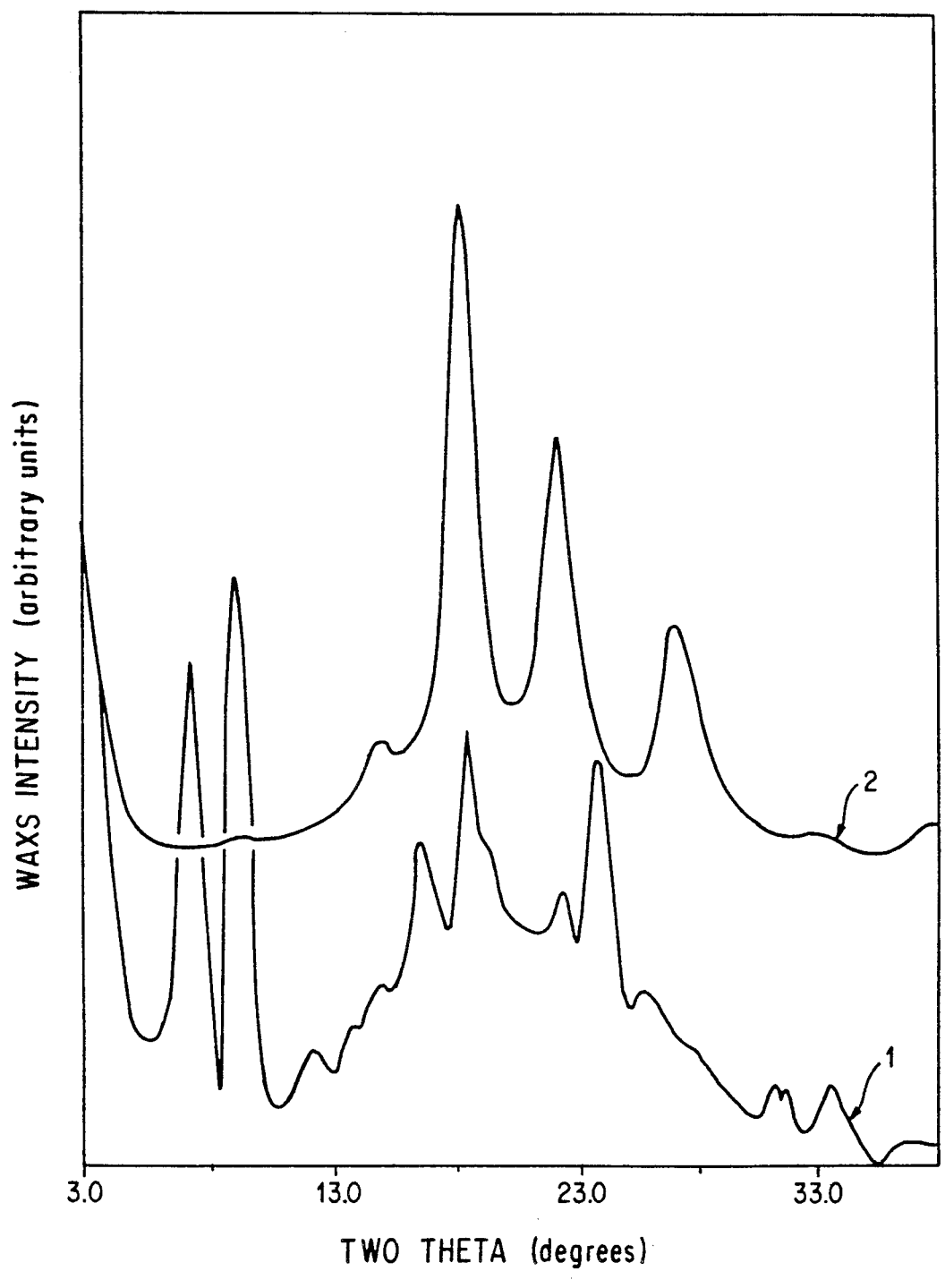

FIG. 14 shows a WAXS for LARC-CPI-BTDA film of the present invention dried under constraint.

Figure 15:
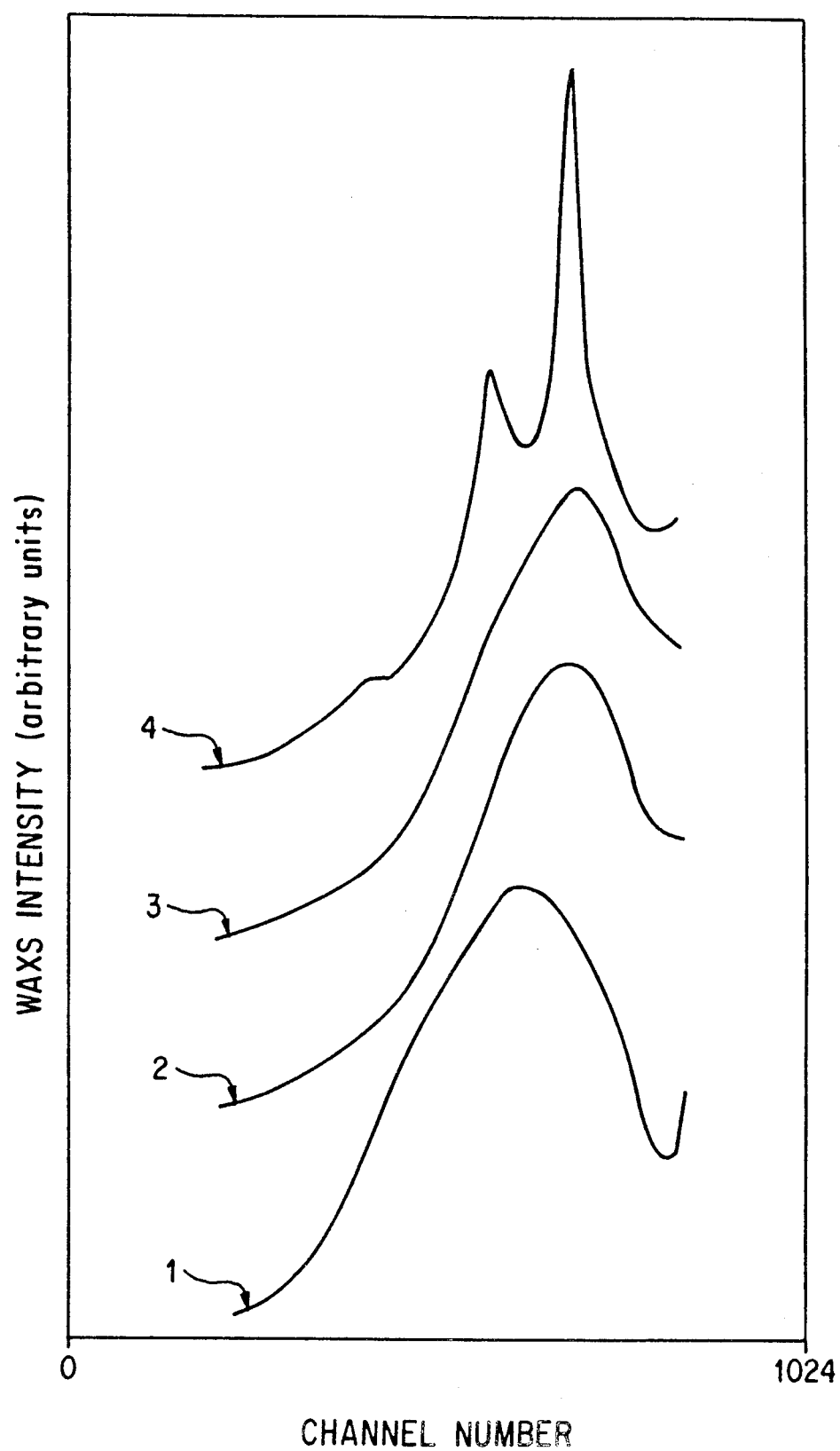

FIG. 15 shows real-time x-ray intensity vs. channel number (scattering angle).

Figure 16:
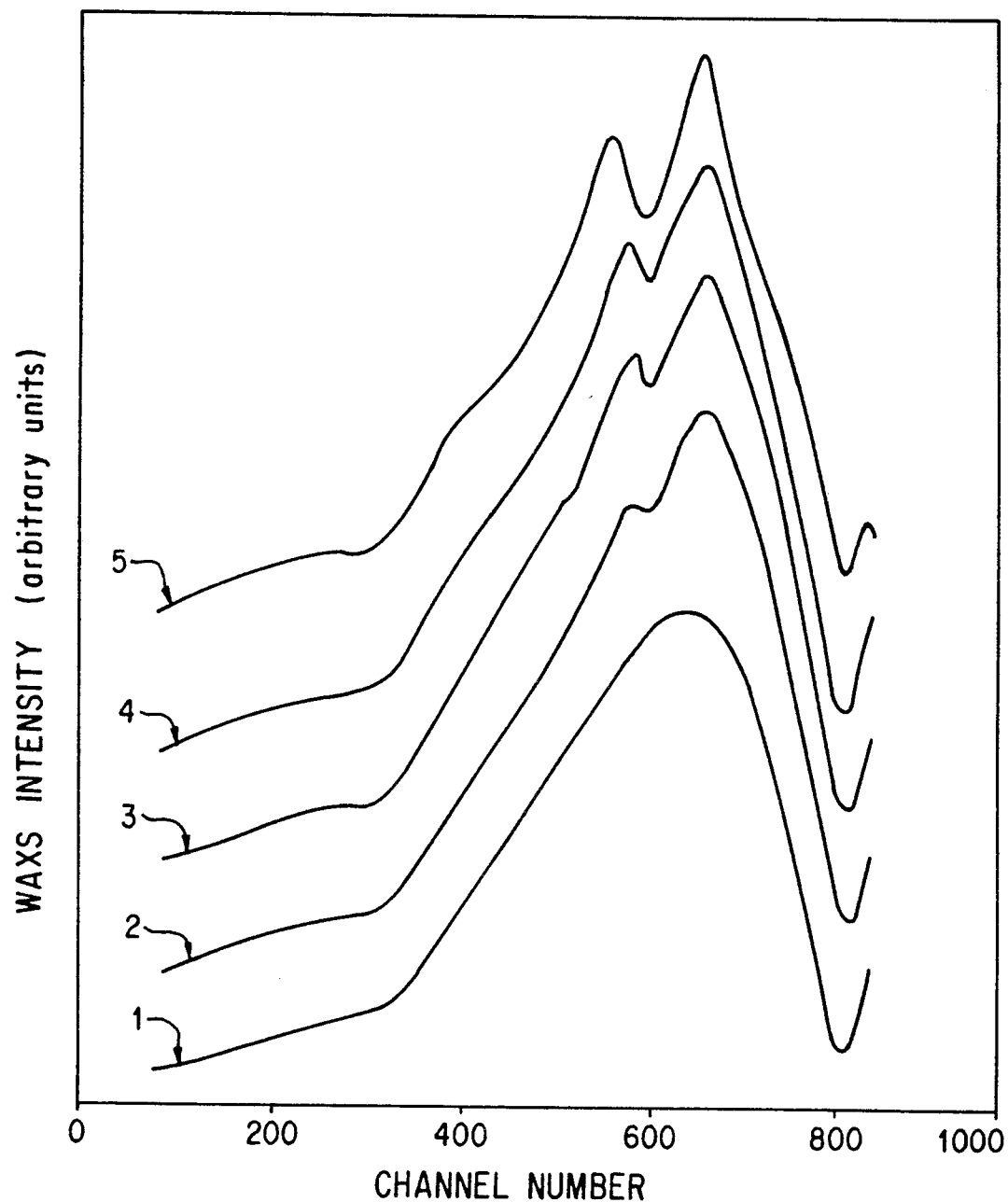

FIG. 16 shows real-time x-ray scan results for residence time study.

Figure 17:
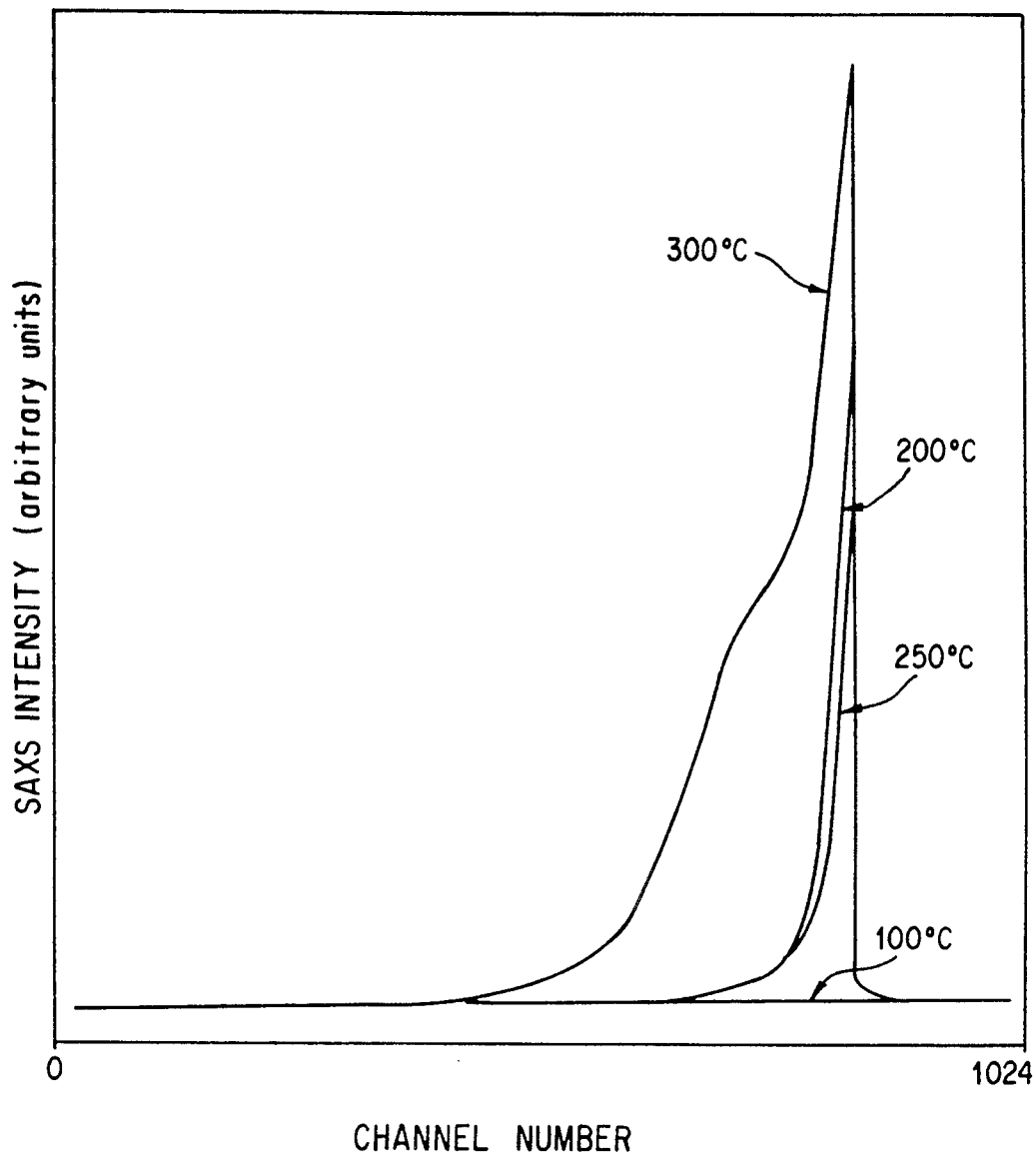

FIG. 17 shows SAXS intensity scans of LARC-CPI-BTDA of the present invention as a function of temperature.

Figure 18:
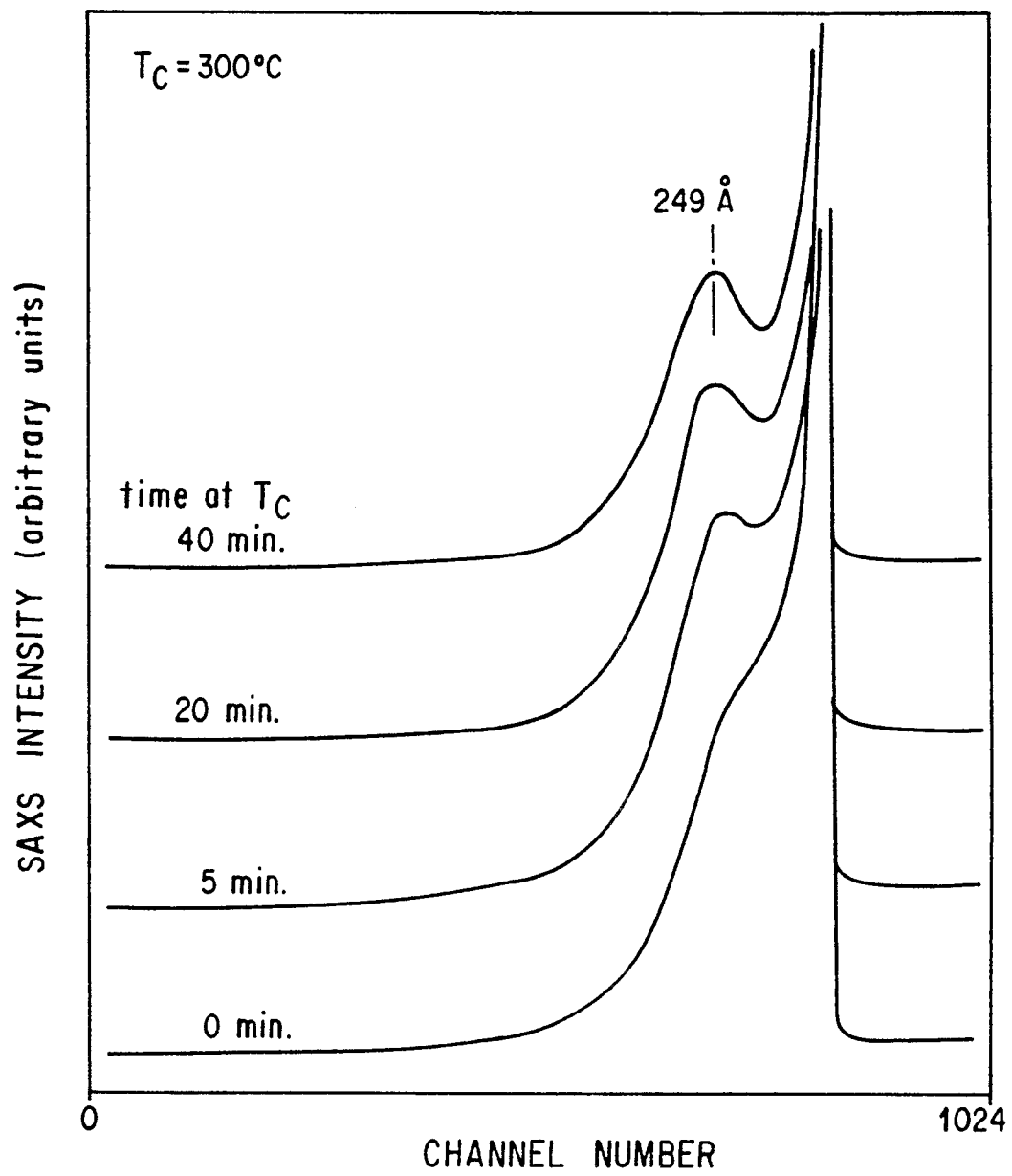

FIG. 18 shows time development of structure in LARC-CPI-BTDA film of the present invention at 300° C.

Figure 19:
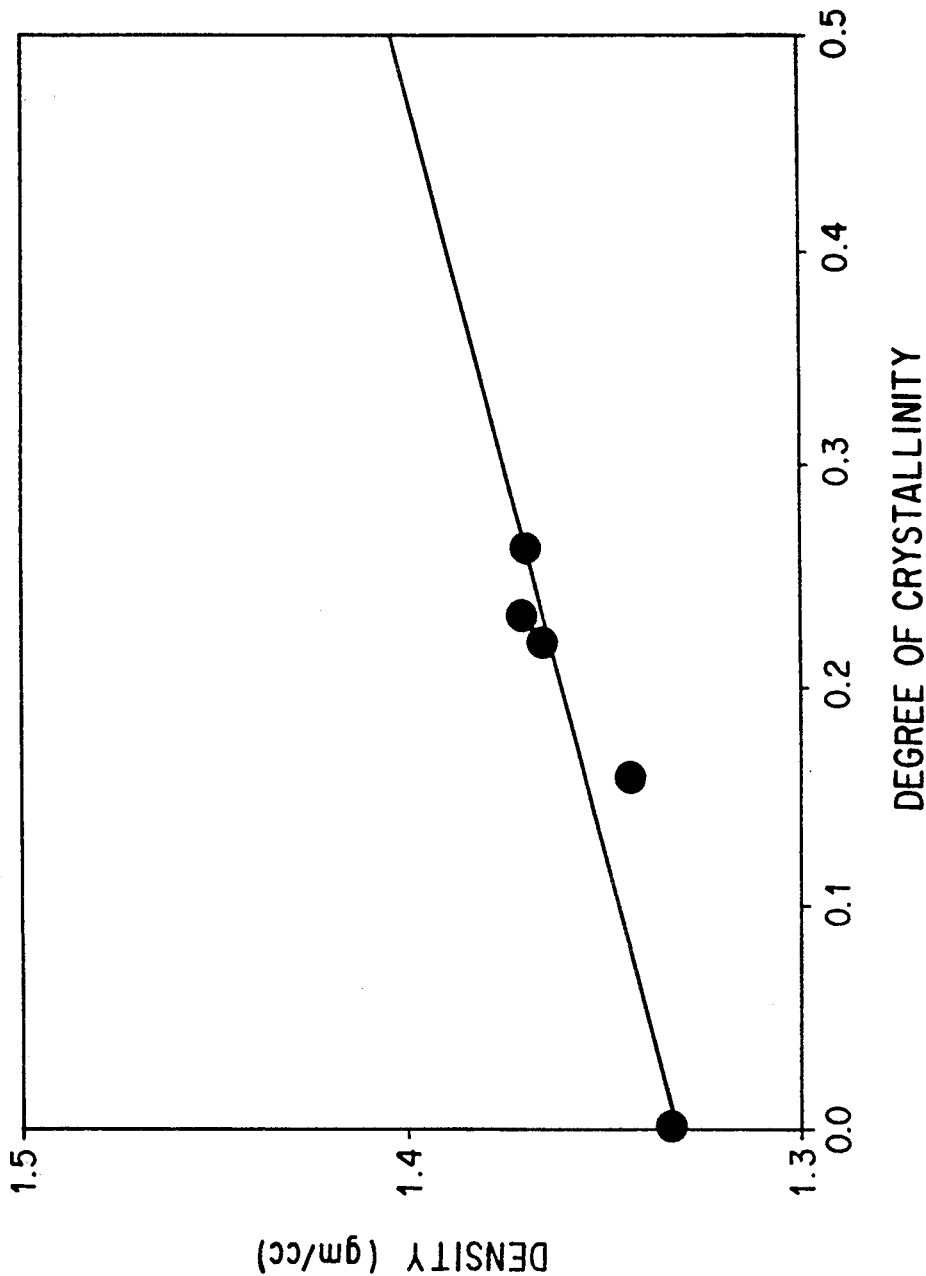

FIG. 19 shows x-ray crystallinity vs. density for a LARC-CPI-BTDA film of the present invention.

Figure 20:
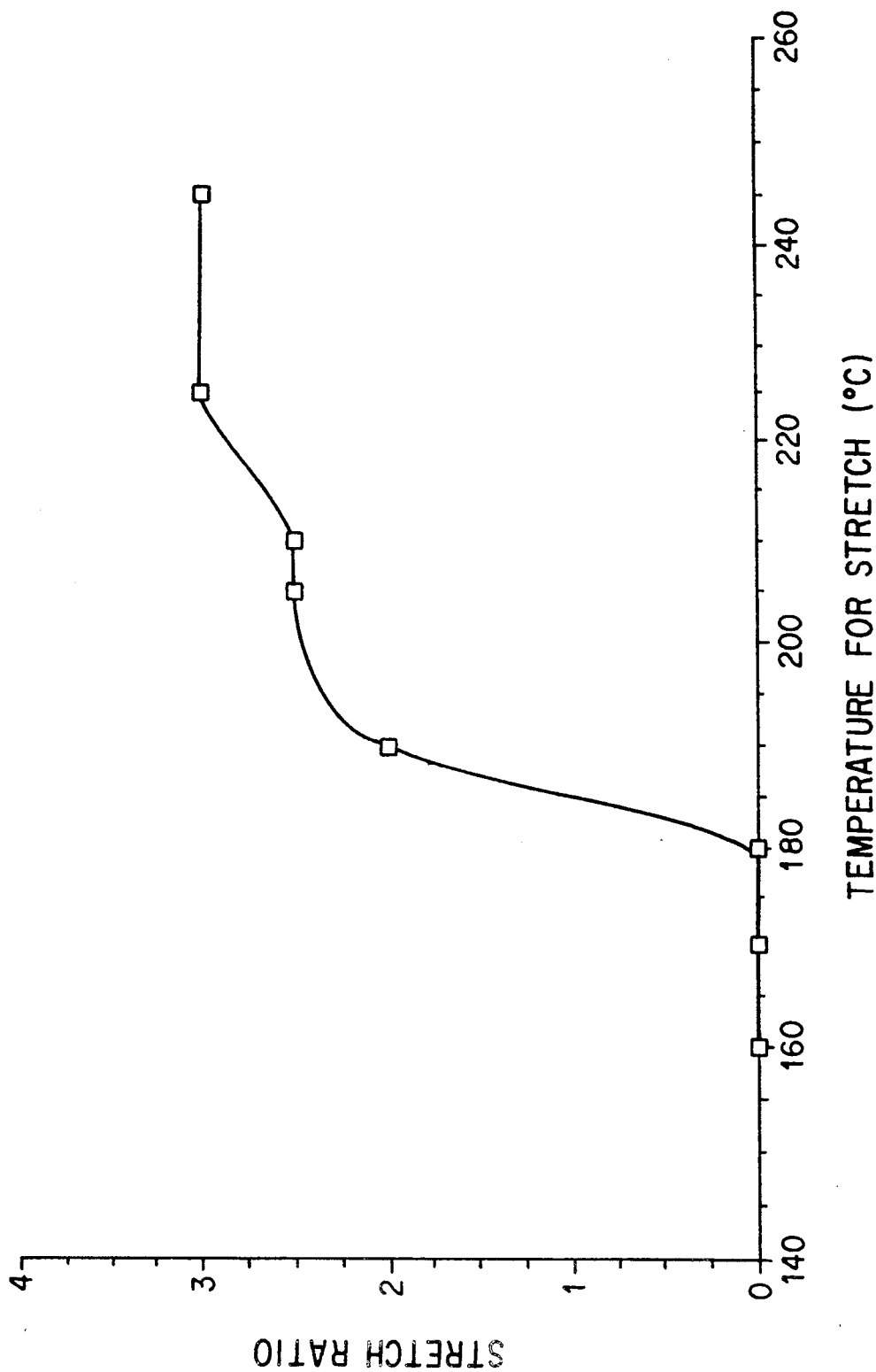

FIG. 20 shows attainable draw ratio vs. stretch temperature in the hot shoe.

DETAILED DESCRIPTION OF THE INVENTION

The conditions under which the methods of the present invention are carried out are dependent upon the particular semicrystalline thermoplastic polymer being processed and can be readily determined by the skilled artisan in accordance with teachings herein using known techniques.

Temperatures at which the crystallization and/or imidization steps of the present invention are carried can be determined by developing a correlation between (a) thermal exposure of cast films or rate of cooling of a film extruded in the melt and (b) level of crystallization and/or imidization attained thereby to establish lower limits for initiation of crystallization and/or imidization, as well as an upper limit beyond which no crystallization and/or imidization will occur. These correlations can be made using techniques known to the skilled artisan, as will be illustrated hereinafter with respect to a particular semicrystalline thermoplastic polymer. The desired degree of crystallinity and/or imidization attained prior to orientation is such to provide a polymer which can be easily oriented while obtaining high molecular orientation.

In embodiments wherein a semicrystalline thermoplastic polymer film is rendered amorphous before orientation, the minimal time required at high temperature prior to quenching can be determined, e.g., by heating film samples to various temperatures and examining the films by DSC. Similarly, the annealing temperature and time to reintroduce crystallinity into such films can be determined by measuring their physical properties.

The optimum conditions for orienting a film comprising a semicrystalline thermoplastic polymer in accordance with the present invention can be readily determined by evaluating the effects of specific orientation conditions on film properties such as tensile modulus, strength and elongation. In some embodiments, the orientation step is combined with the final crystallization and/or imidization step. This may be achieved, e.g., by selecting drawing conditions which generate sufficient heat to cause the desired degree of crystallinity and/or imidization.

The present invention will be illustrated by the use of a particular class of polyimides, i.e., LARC-CPI polyimides, and in particular, LaRC-CPI-BTDA. However, the invention is not so limited. LARC-CPI semicrystalline polyimide polymers for use in the present invention preferably contain aromatic ether and ketone connecting groups which contribute thermoplastic processability and toughness. Synthesis of such polyimide materials involves reacting a diamine monomer with a dianhydride comonomer in solution to form a polyamic acid. The polyamic acid solution can then be thermally treated to close the imide ring and form a polyimide.

Figure 1A:
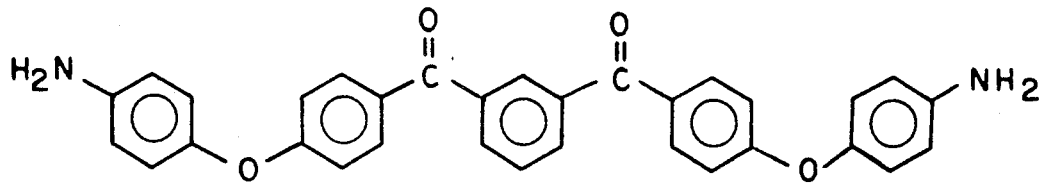
FIG. 1A and 1B show the structure of some diandhydride monomers for use in the present invention.
Figure 1B:
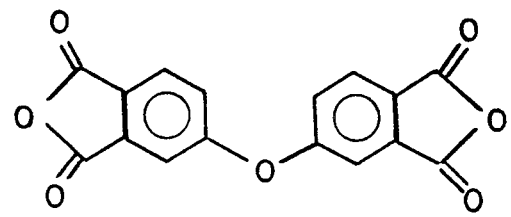
Figure 1B:
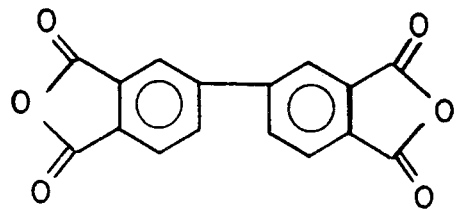
Figure 1B:
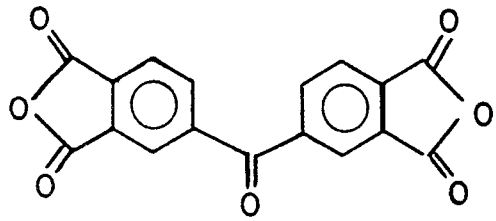

1,3-bis (4-aminophenoxy-4-benzoyl)benzene (shown in FIG. 1A, hereafter referred to as "1,3-BABB") was used as the diamine monomer to prepare LARC-CPI polyimide films in accordance with the present invention. Crystallinity is introduced into a LARC-CPI polyimide by selection of an appropriate dianhydride monomer to react with 1,3-BABB. One such preferred dianhydride monomer is 3,3',4,4'-benzophenonetetracarboxylic acid acid dianhydride ("BTDA"). In investigating the properties of 1,3-BABB based polyimides, two other dianhydride comonomers were used, i.e., 3,3',4,4'-oxybisphthalic anhydride (ODPA), and sym-biphenyl tetracarboxylic dianhydride (s-SBDA). FIG. 1B shows the structures of the dianhydride monomers used.

Polymerization with BTDA yielded preferred polyamic precursor polymer for use in the present invention. Accordingly, studies on LARC-CPI-ODPA and LaRC-CPI-s-SBDA were limited. However, it is thought that these polymers may be processed in accordance with the present methods.

Figure 2:
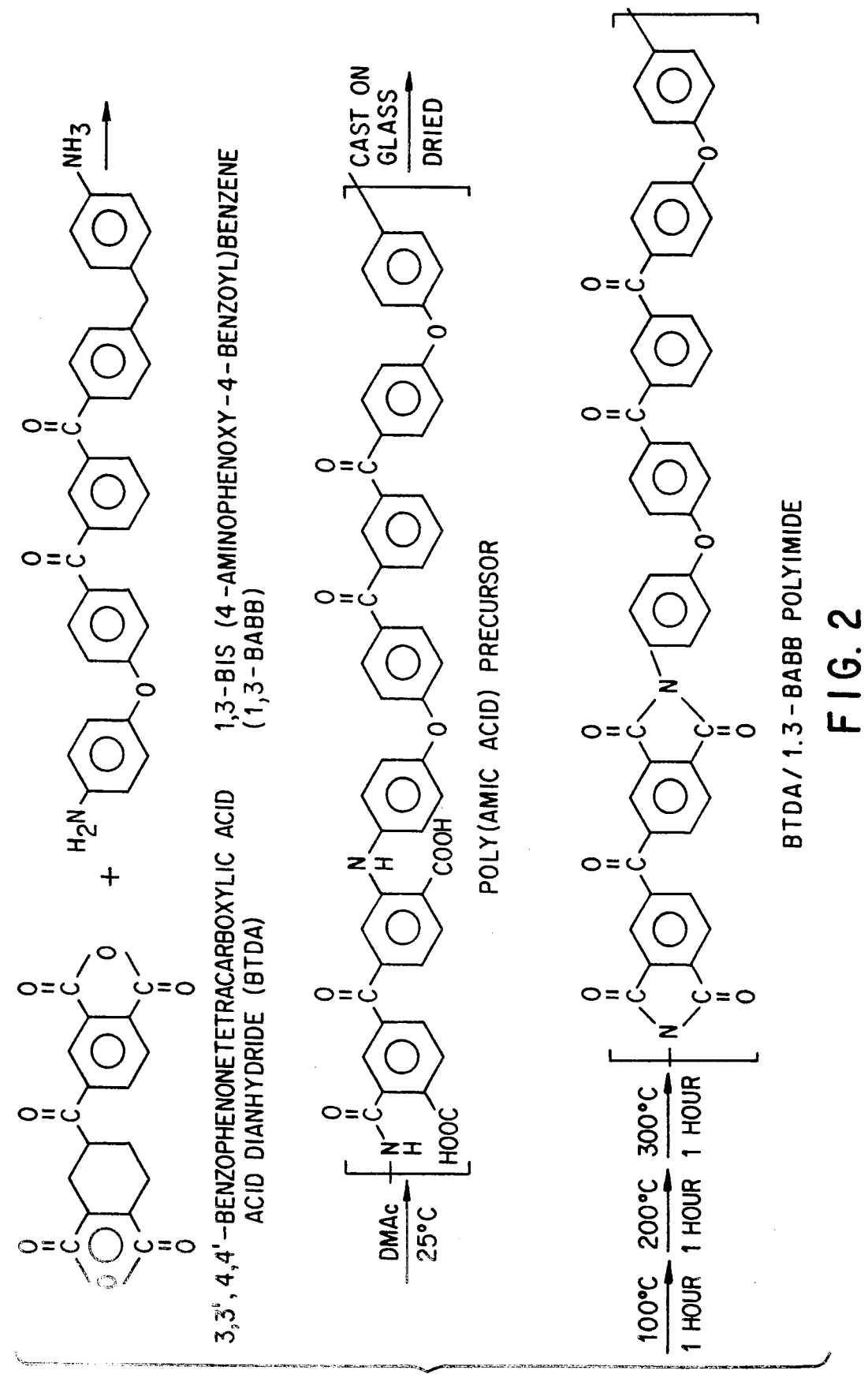
FIG. 2 shows the polymerizaton of LaRC-CPI monomers to form polyimide.

The polymerization was carried out using conventional techniques. Such procedures and methods of characterizing these precursors are described below in the Examples. FIG. 2 illustrates the polymerization reaction leading to LARC-CPI-BTDA polyamic acid polymer and its conversion to LARC-CPI-BTDA polyimide.

In order to achieve the highest performance LARC-CPI films, it is preferable to use starting polyamic acid solutions of high molecular weight in which the presence of gels, dust particles, oil droplets and other artifacts that can cause defects in thin films are minimized. See Example 1.1.

LaRC-CPI polyamic acid solutions were cast as described in Example 2 below at solids concentrations ranging from 12–25 percent. For most of the work disclosed herein, a 20 percent solids concentration was used, because it produced a solution that could be readily poured onto a casting plate but was still viscous enough to form into a uniform film that was not disturbed by turbulent air currents.

Cast LARC-CPI-BTDA films, produced as described in the Examples, were tested to develop a correlation between thermal exposure and level of imidization, in order to establish lower and upper limits of imidization. That is, the films were heated in stages to temperatures exceeding 300° C. At temperatures exceeding 300° C., the amide-acid linkages in the polyamic acid precursor polymer converted almost completely to the fully cyclized, imide structure shown in FIG. 2. Trace amounts of uncyclized segments did remain in these polymer films, as evidenced by amide-acid absorptions present in infrared spectra of these films. However, the films were considered to be fully imidized when stage-dried at or about 300° C. The results of typical imidization experiments are described in Example 3 below.

The infra red spectra of LARC-CPI-BTDA films that had been heated to different maximum temperatures during the drying process were taken and a correlation between thermal exposure and level of imidization was developed which established lower limits for initiation of imidization, as well as an upper limit beyond which no further imidization would occur. See Example 3.4 below.

Infrared analysis indicated that imidization initiated to a very small degree at film temperatures as low as 50° C. Imidization was not complete however, until a film drying range of 300°–315° C. was reached. The presence of significant amounts of residual solvent could also be detected in films that had been dried at various temperatures below this range. This indicated that solvent interacted strongly with the polyamic acid polymer and was trapped within the free volume between molecules until quite high temperatures were reached.

Figure 3:
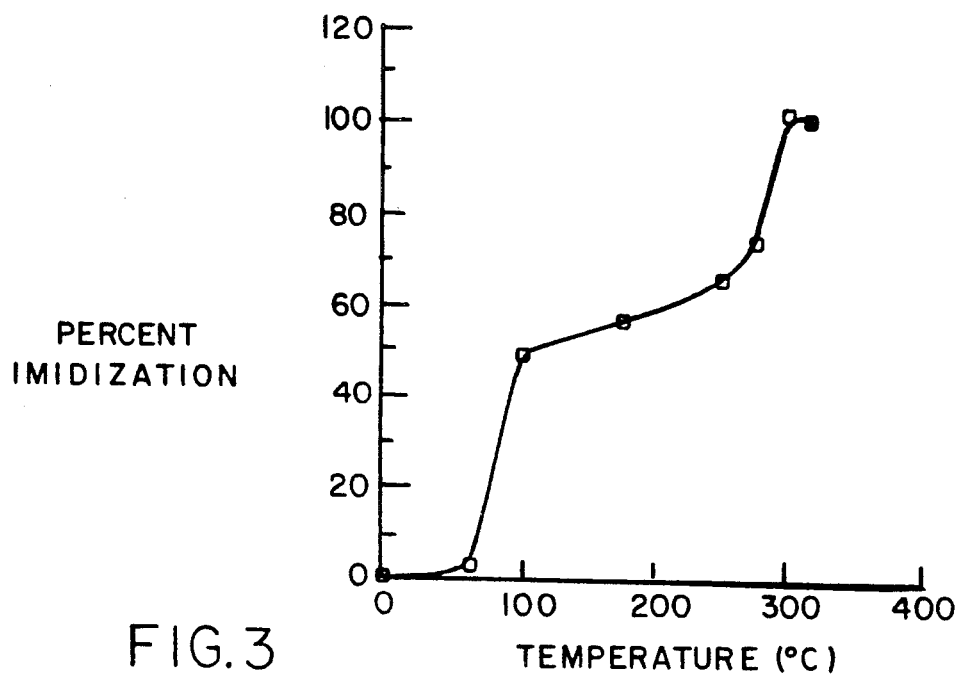
FIG. 3 shows the effect of temperature upon percent imidization of LaRC-CPI films of the present invention, as determined by IR.

It is believed that films cured below the maximum imidization temperatures contained at least two different molecular bond types since the polyamic acid linkages had not been converted entirely to polyimide bonds. These films appeared to function more as copolymers of the two types, with stretchability and resulting mechanical properties reflecting the same. FIG. 3 presents the correlation between percent imidization and maximum imidization temperature for LARC-CPI-BTDA films. The corresponding tensile data for these specimens is disclosed hereinafter. Table IV in Example 3.2 provides information on baseline specimens for ODPA, BPDA, and BTDA LARC-CPI films which were cast and fully imidized at elevated temperatures without orientation.

The conditions for the step of orienting LARC-CPI polymers in accordance with the present invention were determined by evaluating different pre- and post-stretching thermal treatments. In addition to thermal treatments which modified the level of imidization, the effort involved prestretch quenching to render films amorphous for ease of stretching as well as post-stretch annealing to enhance LaRC-CPI's crystallinity and thermal stability. Different stretching temperatures, rates and draw ratios were employed.

Uniaxial stretching was used to determine the effect of various processing temperatures, imidization treatments, and other variables on film mechanical properties. Because properties achieved unidirectionally are often higher than those of a balanced film, the technique is often more sensitive to changes in processing conditions than is biaxial stretching, and it can often provide more insight into the effects of a particular approach. The uniaxial stretching was accomplished on the T. M. Long stretcher, the web stretcher, and the hot shoe. Biaxial stretching was conducted with the aid of the T. M. Long Stretcher.

The rate of stretching was also varied in an effort to determine the range of rates which could be used to orient LARC-CPI on the Long stretcher. Once this was done, a reasonable rate of deformation was then selected in order to reduce the number of experimental variables involved. In general, rates of 1 to 10 in. per sec were found to work effectively on the T. M. long stretcher. For much of the work on LaRC-CPI-BTDA, a rate of 2 in./sec was used for biaxial stretching and 6 in./sec for uniaxial stretching. On a 4 in. rectangular specimen undergoing stretching uniaxially or biaxially this corresponds to effective engineering strain rates of 1.5 and 1.25 $sec^{-1}$, respectively.

Degree of imidization plays a major role in the ability to deform LaRC-CPI. In part, this is due to the fact that the system is complex and changes with increasing imidization temperature. As discussed previously, a LARC-CPI film imidized films contain essentially no polyamic acid and virtually no solvent. Because of these factors, there is a definite effect of imidization temperature on the ability to deform polymer system. To quantify this effect, fully imidized films were examined. See Example 4.2. These films were more difficult to orient than partially imidized films.

A number of imidization temperatures were selected as intermediate points for conducting partial imidization experiments. These included 500°, 1000°, 190°, 2500°, and 2750° C. Other temperatures were used on occasion in order to more accurately define the behavior of the polymer within the given temperature regimes, or when drawing conditions indicated it was advisable to do so. In some partial imidization experiments, the polyamic acid was partially converted to polyimide at a given temperature and the polymer was stretched to as high a draw ratio as possible and its properties measured. For other experiments, the imidization reaction was completed after stretching at full imidization temperature and then the film properties were measured.

Table II below presents a summary of the best mechanical properties obtained for LARC-CPI-BTDA polyimide film cast as described in the examples, partially imidized, oriented, and then further, heated to 300° C. and above to complete the imidization process in accordance with the teachings herein.

TABLE II

| MECHANICAL PROPERTIES OF LaRC-CPI-BTDA FILM | | | | | |
|---|---|---|---|---|---|
| Film Orientation | Imidization Temperature | Stretch Ratio | Tensile Strength (ksi) | Tensile Modulus (msi) | Elongation (%) |
| Unoriented (control) | 250° C./ 30 min | 1x | 21.2 | 0.60 | 5.1 |
| Uniaxial | 250° C./ 30 min | 4x | 61.1 | 1.2 | 7.6 |
| Balanced Biaxial | 250° C./ 30 min | 3x ea (9x total) | 30.1 | 0.76 | 9.5 |

A useful tool in analyzing the thermal properties of LARC-CPI films was in the Differential Scanning Calorimeter (DSC). DSC work was conducted on LARC-CPI-BTDA films in various states as described in Example 5 below to obtain data on a number of material properties. Foremost among these was information about phase transitions of LARC-CPI materials and, in particular, the glass transition temperature $T_g$ and the crystalline melt temperature $T_m$. This latter temperature was useful when performing crystallinity studies as an adjunct to x-ray spectroscopy. Other types of transitions of interest included the crystallization exotherm as well as the imidization reaction peak which can appear in partially cured materials.

The presence of a sizeable crystalline component in LARC-CPI-BTDA polymer confers a high degree of thermal stability and solvent resistance. X-ray diffraction studies on the crystallinity of these polymers, processed in accordance with the teachings of the present invention, are described in Example 6 below.

Two principal types of WAXS experiments were conducted. The first involved traditional room temperature wide-angle x-ray measurement of film crystallinity following different thermal treatments. Here, area under the intensity profile is employed to obtain an estimate of the percent crystallinity. This type of experiment was used to examine the importance of thermal history of the film.

In addition, WAXS was used for solvent crystallization films using different drying conditions, including both free and constrained drying, to assess their effects on film crystallinity.

The second type of experiment involved real time wide-angle x-ray scattering. Here, the purposes was to monitor the development of crystallinity with time and temperature. This technique was conducted with the high energy synchrotron and was particularly useful in examining the complex dynamics occurring with time and temperature in partially imidized LARC-CPI films.

Several conclusions can be drawn from Example 6. First, LaRC-CPI-BTDA film has a broad range over which it can crystallize. X-ray data on specimens imidized to 100° C. indicate that crystallization can occur at temperatures as low as 150° C. Similarly, fully imidized LARC-CPI can be annealed and its crystallinity enhanced at temperatures in the vicinity of 300° C. to 350° C. This is an extremely broad range and is due in part to the potential range of imidization levels for the high polymer, ranging from near zero to 100 percent. The x-ray data also shows that partially imidized film systems are exceedingly complex. In particular, temperature brings with it the energy needed to accomplish ring closure and cyclization, while is simultaneously lowers activation energy barriers and allows molecules to reach the most favorable conditions for crystallization. This causes simultaneous crystallization and imidization at elevated temperatures within the polymer.

The bulk density of selected film specimens was measured to provide input for determining (i) the density of fully amorphous and fully crystalline LARC-CPI processed over one range of temperature for use in a two-phase mode of structure, and (ii) the correlation between density and x-ray crystallinity, at least over a given processing range. The objective of was to be able to estimate the percent crystallinity using simple density measurements.

Measurement of density was accomplished using conventional techniques and approaches in a density gradient column using a gradient formed form calcium nitrate and water. These studies are described in Example 7 below.

Both infrared (IR) and UV-VIS spectroscopy data were taken. It was possible to follow the level of imidization with processing temperature using IR spectroscopy.

Figure 4:
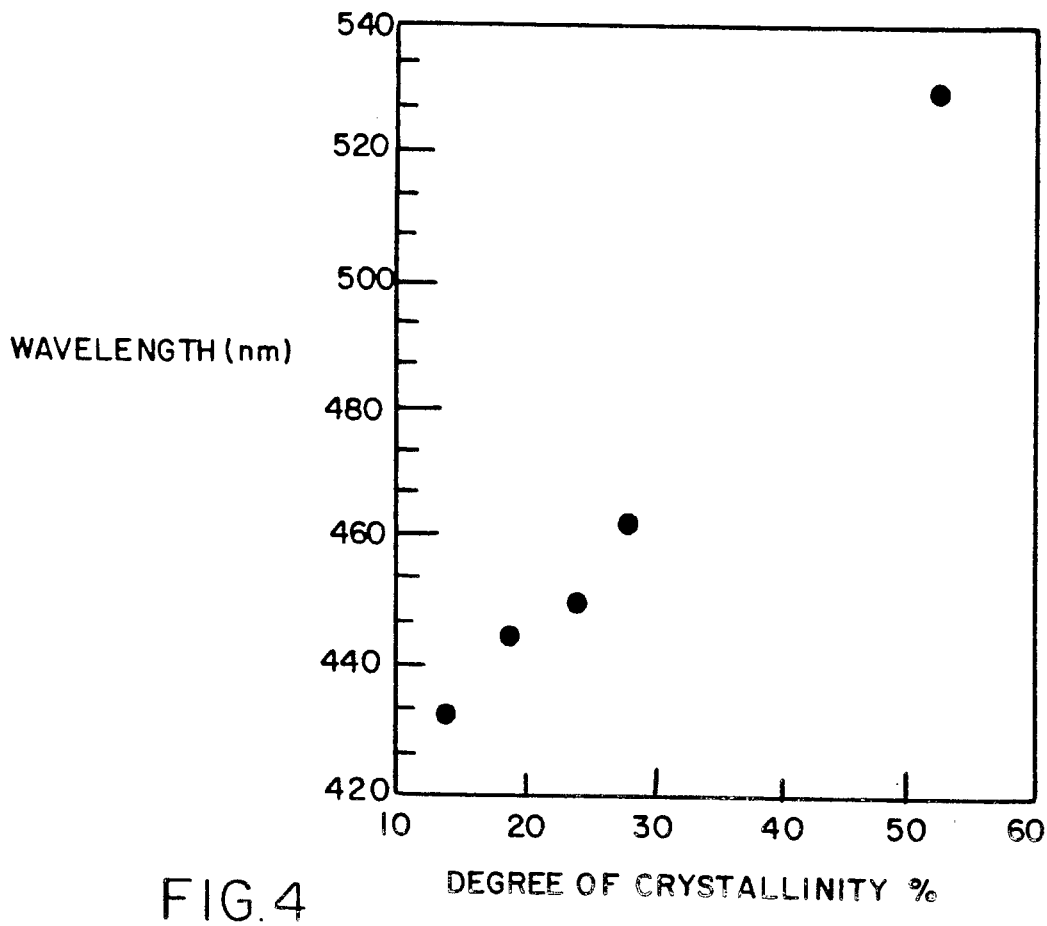
FIG. 4 shows the wavelength of peak maximum in UV-VIS vs. percent crystallinity.

An unexpected relationship between the degree of x-ray crystallinity and the wavelength of the intensity maximum in the UV-visible light scattering spectrum was also found. FIG. 4 illustrates the wavelength of the peak maximum vs. degree of crystallinity for samples spanning a very wide range of crystallinity. The shift in the wavelength of the peak maximum strongly suggest that a planar ordering occurs during crystallization. Spectra were the same when taken with polarized incident radiation and the films rotated about the film normal.

The wavelength vs. crystallinity relationship indicates that UV-VIS spectroscopy should be useful as a rapid screening tool in the commercial environment for rank ordering LARC-CPI films according to their degree of crystallinity.

It was unexpectedly discovered that semicrystalline thermoplastic polymer films, such as fully imidized polyimide films, could be rendered amorphous while maintaining their structural integrity, could be oriented in the amorphous state and crystallinity reintroduced. Amorphous films have some advantages in orientation processing. These films have no preestablished crystalline microstructure which must be broken up in order to orient the material, and which effectively limits the maximum attainable draw ratio. In amorphous films, orientation can proceed relatively quickly.

Semicrystalline, completely imidized LARC-CPI-BTDA polyimide films were rendered amorphous by heating the film for less than one minute at 400° C., then quench-cooling the films in air under conditions to inhibit crystallization. Amorphous LARC-CPI films were stretched uniaxially more than 2× at temperatures just above their Tg (222° C.) and biaxially about 1.2×. Unoriented, amorphous LARC-CPI films crystallized only slowly and incompletely, even when heated for hour at 300° C. in air. In contrast thereto, stretched amorphous films recrystallized completely within minutes when heated under restraint to 300° C. This process makes it possible to produce biaxially-oriented LARC-CPI films with highest mechanical properties on an industrial scale, using a continuous, automated process. See Example 8.

The present invention will be further illustrated with reference to the following examples which aid in the understanding of the present invention, but which are not to be construed as limitations thereof.

EXAMPLES

EXAMPLE 1. PRECURSOR POLYMERS

Figure 1D:
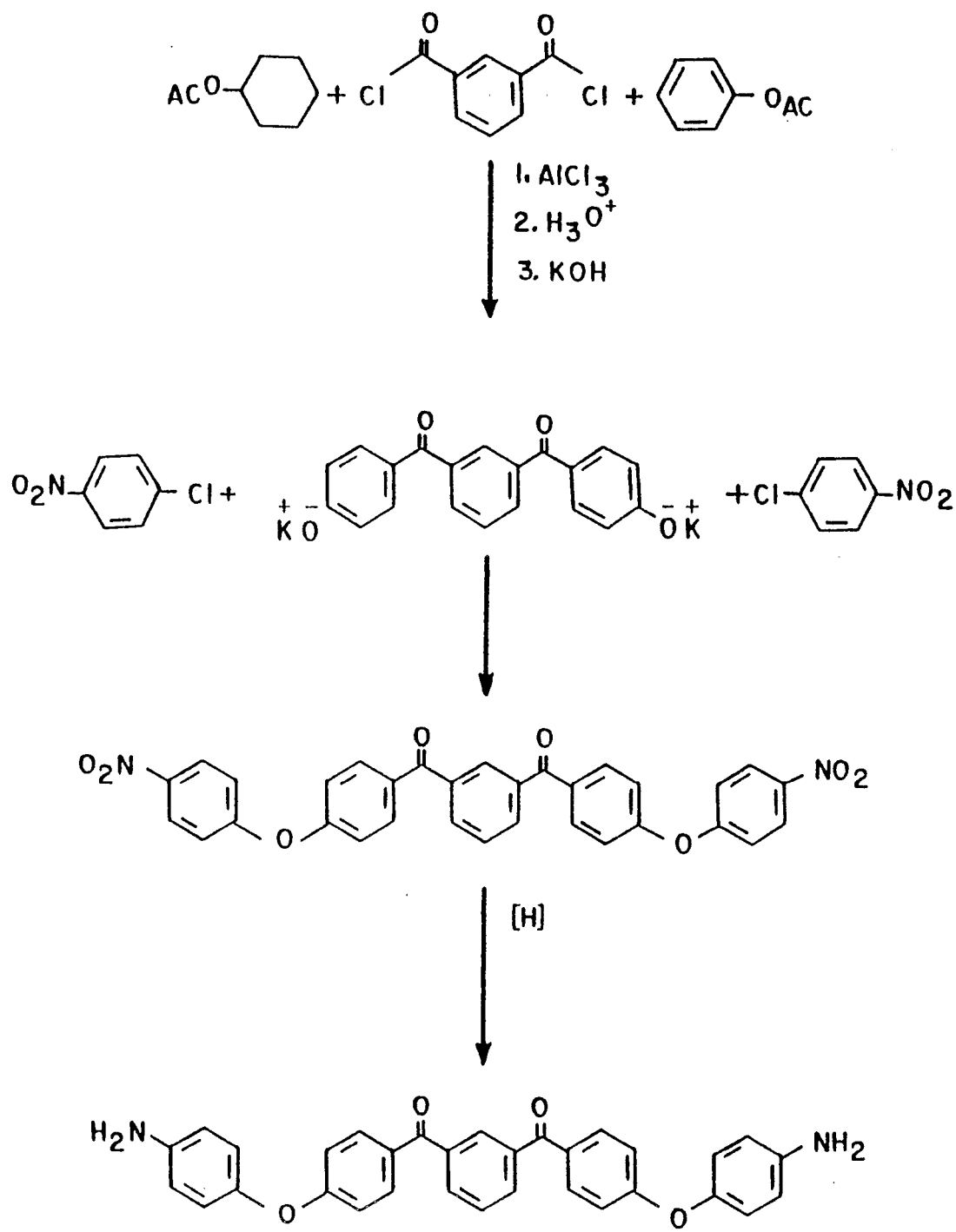

Methods of synthesizing 1,3-BABB LARC-CPI monomer are shown in FIGS. 1C and 1D.

Figure 5:
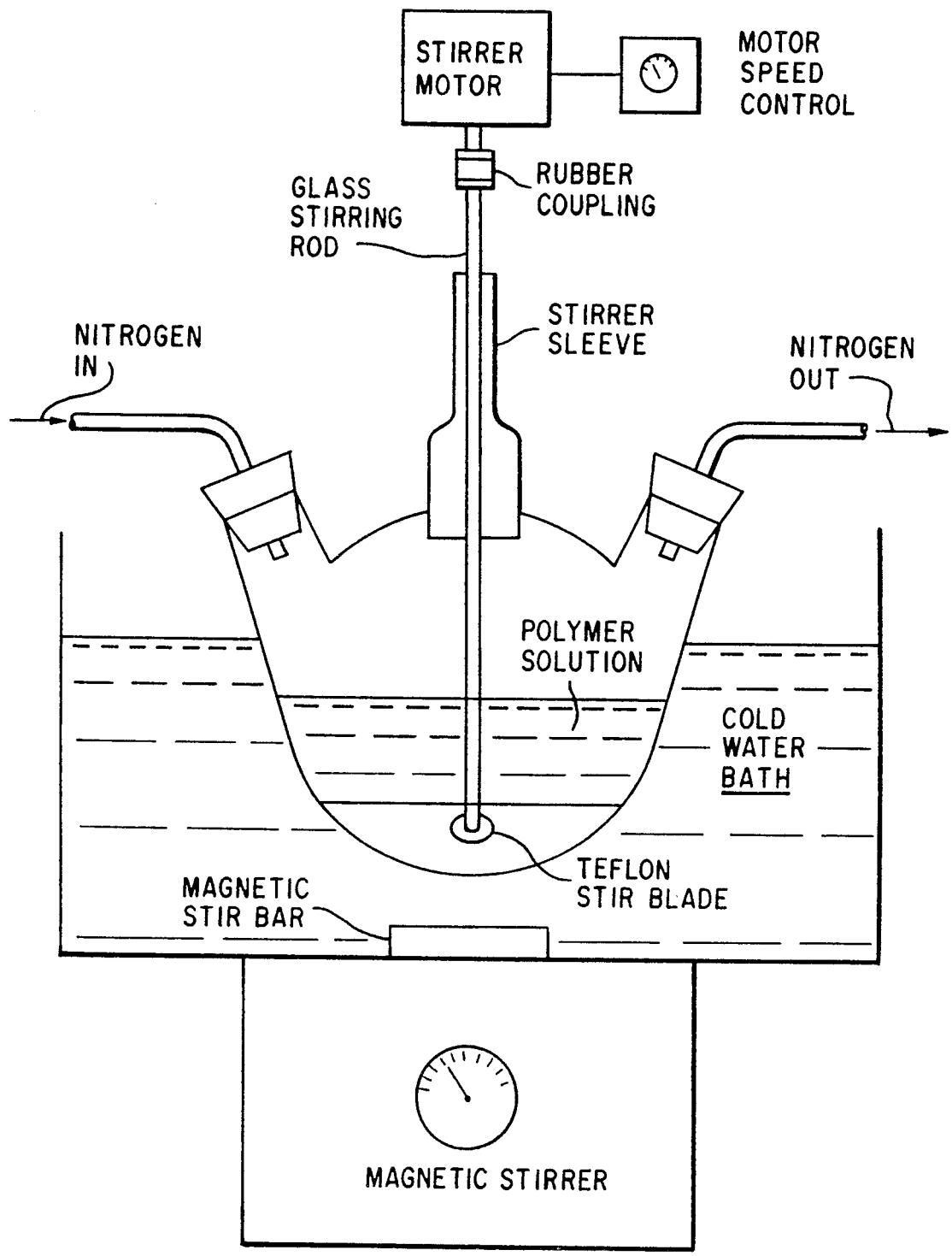
FIG. 5 shows an apparatus for use in polymerizaton of LaRC-CPI.

The following are general steps used for synthesizing LARC-CPI precursor polymers:

1.1 Synthesis
1. Clean and oven-dry all glassware.
2. Set up glassware and equipment as illustrated in FIG. 5.
3. Purge reaction flask with argon for 1 hr to remove residual moisture.
4. Set-up an ice bath under the reaction flask.
5. Weigh out diamine monomer (1,3-BABB) into a glass beaker.
6. Distill and dry N,N dimethylacetamide (DMAC)) from $P_2O_5$ with a molecular sieve. Filter DMAC on a paper filter to remove sieve particulates.
7. Alternatively, use high grade (HPLC) DMAC.
8. Measure an amount of dry DMAC necessary to create a solution of 20 weight percent solids.
9. Transfer BABB monomer into reaction flask using two thirds of the measured DMAC in 1 ml aliquots.
10. Stir BABB solution for one hour to completely dissolve monomer.
11. Weigh out dianhydride monomer (ODPA, S-BPDA, BTDA) in equimolar stoichiometric amounts with BA,BB.
12. Add diahydride to BABB solution using remaining third of DMAC.
13. Keep reaction apparatus immersed in an ice bath; allow ice bath to melt to return to room temperature of its own accord (4–6 hr).
14. Stir solution for 24 hr if using BTDA, or 48 hr if using ODPA or S-BPDA. Pressure filter the polyamic acid solution. A 2 μm stainless steel filter is preferred.
15. Remove a 3-ml aliquot after filtration for inherent viscosity determination.
16. Vacuum degas polyamic acid solution to remove entrapped air bubbles.
17. Store at 0° C. under argon atmosphere.
18. Centrifuge solution for 1 hr to settle particulate matter.
19. Allow solution to stand one done hour at room temperature prior to casting films.

1.2 -BABB/ODPA Solution Polymerization

Initial experimentation began by using the ODPA dianhydride monomer. A solution was prepared in N,N dimethylacetamide (DMAC) at 15 percent solids. The 1,3-BABB monomer was dissolved in the DMAC solvent by stirring for 1 hr at 0° C. Next, the ODPA comonomer was added to the solution. The solution was maintained at 0° C. for 72 hrs. while under constant agitation. Intrinsic viscosity was determined to be 1.0dl/g.

For the second polymerization, a 15 percent solids solution was prepared in a 250 ml three-necked reaction flask using ODPA as the dianhydride. The reaction flask was washed, oven-dried, and argon purged to eliminate all traces of moisture, as water was found to greatly inhibit the reaction. The DMAC used was distilled from $P_2O_5$ and molecular sieve-dried before use, and this dry solvent filtered to remove sieve particulates. Then 9.2607 gms (0.0185 moles) of BABB were added to the dry reaction flask; the weighing beaker was rinsed with approximately two-thirds of the DMAC, and this rinse added to the BABB monomer. The DMAC/BABB mixture stirred for 1 hr 0° C. under a slow argon purge, until the solution became a clear brownish-yellow solution. Next, 5.7393 gms (0.01085 moles) of the ODPA monomer was added to the stirring solution. The weighing beaker was rinsed with the remaining third of the DMAC, and this rinse added to the solution. The ODPA dissolved in approximately 5 minutes, after which the solution was allowed to slowly return to room temperature. It was found that the reaction formed a gel if not cooled.

Although this gel formation is reversible with vigorous stirring, small gel particles interfered with film casting; therefore, effort was made to prevent gel formation from occurring. This procedure formed the basis of all further polymerizations. Unlike the S-BPDA and BTDA reactions described below, no 1,3-BABB-/ODPA reactions involved the addition of CHP. A percent solids range of 12-25 percent was attained.

1.3 BABB/S-BPDA Solution Polymerization

The next comonomer used in conjunction with the 1,3-BABB diamine was s-BPDA. A procedure similar to the one described above was followed. However, it was noted that the S-BPDA did not dissolve as readily in DMAC as did the ODPA. After 24 hours of stirring, the solution still had gelatinous particles present. For this reason, the reaction was continued for a total of 48 hours, after which time the gel had cleared. Also, an additional step was added. It was believed that if nascent water which developed during thermal imidization could be removed as an azeotrope with cyclohexyl pyrrolidone, then equilibrium would shift toward the completion of imidization. Therefore, 5 percent by weight cyclohexyl pyrrolidone (CHP) was added to the reaction after 24 hours of stirring. 1.4 BABB/BTDA SOLUTION POLYMERIZATION.

The third dianhydride used for polymerization with 1,3-BABB was BTDA. Some polymerizations were carried out using a procedure similar to that described above for S-BPDA. However, whereas the 1,3-BABB-/ODPA and 1,3-BABB/s-BPDA reactions exhibited a high bulk viscosity (as witnessed by the solution climbing up the stirring rod) only after many hours of stirring, the 1,3-BABB/BTDA reaction exhibited high bulk viscosity after only 2 hr. The reaction was carried out for 48 hr with the addition of 5 weight percent CHP at the 24 hour point. In subsequent reactions, due to the high bulk viscosity of the solutions, CHP was added immediately following the addition of the dianhydride to the 1,3-BABB solution to insure that it would become well mixed within the polymer solution.

The process was further modified in some preparations. In this instance, BABB diamine, two third of the DMAC, and 5g of CHP were combined in an argon-purged flask at 0° C. and stirred for 1 hr. Following this, 5.000g BTDA were added to the flask and stirred for 18 hr. Near the end of this period, an additional 2.832 g BTDA were dissolved in the remaining DMAC and stirred in a separate vessel. when clear (after approximately 1 hr of stirring), this solution was added to the reaction flask. This total solution was then stirred for 48 hr. As with the BABB/S-BPDA experiment, the purpose of separately combining a quantity of BTDA and DMAC outside the reaction flask was to reduce the possibility of gel formation in the polyamic acid solution, and was intended to significantly increase the inherent viscosity of the solution. Instead of increasing the inherent viscosity, however, the viscosity decreased to 0.83 dl/g at 25° C. at a concentration of 0.50g/dl, the lowest inherent viscosity measured in the 1,3-BABB/BTDA system. Again, it is believed that the dianhydride degraded in solution with DMAC in the absence of a reactive comonomer such as BABB. This procedure was not repeated for other reactions.

In another 1,3-BABB/BTDA reaction, CHP was omitted in order to determine the effects of a more pure polyamic acid. While it had been believed that the CHP aided in imidization, the omission of this material led to a significant increase in viscosity of the polyamic acid (indicating significant increase in molecular weight). This effect more than compensated for any benefits due to the presence of CHP in subsequently cast films. Therefore, CHP was omitted from later polymerizations.

Two other 1,3-BABB/BTDA solutions were each polymerized in a slightly different manner. These solutions were partially chemically imidized after polymerization to increase the imide character of the polyamic acid solution. This technique had been reported to improve the mechanical properties of polyimide fibers spun from polyamic acid solutions. The goal was to produce a film of high polyimide character that could be oriented in the Long stretcher at low temperatures. Addition of acetic anhydride was attempted in an effort to catalyze closure of the imide ring on a percentage of the polyamic acid linkages at room temperature before the solution was cast into film.

For synthesis, both solutions were prepared according to the standard procedure discussed earlier. After 20 hr of stirring, the acetic anhydride was added to the solutions at 5 molar percent (solution A) and 15 molar percent (solution B). Both solutions were stirred for an additional 5 hr. Little apparent viscosity increase was seen in solution A, and the measured inherent viscosity increased slightly from 1.21 dl/g to 1.25 dl/g. However, bulk viscosity of this solution was so poor that the solution could not be cast at an adequate thickness to make films. In solution B, similar effects were seen. Triethylamine was also employed to rapidly catalyze ring closure in the presence of acetic anhydride. This resulted in a high bulk viscosity resin, with a measured intrinsic viscosity of 1.05 dl/g. However, the resulting films were of reduced quality. 1.5 Intrinsic Viscosity Measurements.

Solutions of polyamic acids were initially characterized via intrinsic viscosity measurements. This involved measuring the length of time required by solutions at particular concentrations to drain through a small bore (ASTM size 25) viscometer maintained at a constant temperature of 25° C., and comparing these times to the drain time required for pure solvent. Viscosity was determined from these data in two ways: inherent viscosity was determined by expressing the data as:

$$\text{Inherent Viscosity} = \frac{\ln(\text{solution drain time}/\text{solvent drain time})}{(\text{solution concentration})}$$

Similarly, a reduced viscosity was expressed as follows:

$$\text{Reduced Viscosity} = \frac{(\text{solution drain time} - \text{solvent drain time})}{(\text{solvent drain time} * \text{solution concentration})}$$

Figure 6:
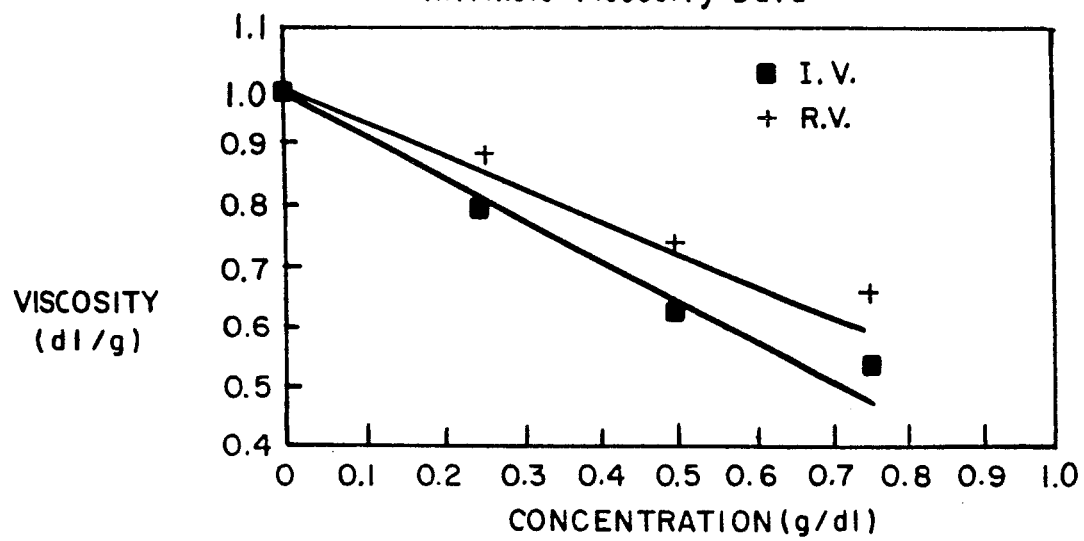
FIG. 6 shows viscosity vs. solution concentration for BABB/ODPA.

These viscosities were plotted against solution concentration, and extrapolated to zero concentration. Both expression extrapolate to the same value at zero concentration. The zero-concentration result was the report intrinsic viscosity (I.V.). In many cases, because of the length of time required to perform the numerous I.V. determinations and the fact that the polyamic acid solution degraded rapidly over time, a single inherent viscosity measurement was substituted. In such instances, the concentration used was 0.5g/dl at a temperature of 25° C. An example plot of viscosity against solution concentration showing the inherent, reduced, and intrinsic viscosities for a typical LARC-CPI polyimide solution is shown in FIG. 6.

EXAMPLE 2—FILM CASTING

Figure 7:
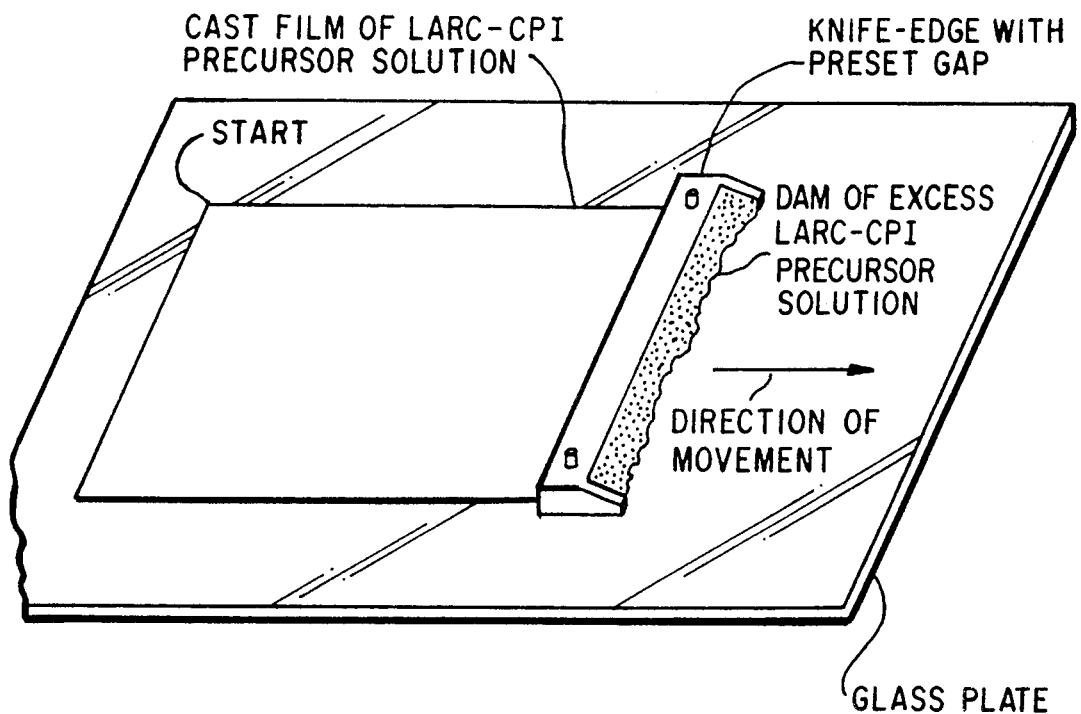
FIG. 7 illustrates one film casting processing for casting LaRC-CPI precursor films in accordance with the present invention.

Casting of LARC-CPI films was accomplished in a Class 100 (or better) clean room. To prepare such films, a filtered solution of precursor polymer prepared in accordance with Example I was poured onto a casting plate and a doctor blade was passed over the film. FIG. 7 illustrates the LARC-CPI precursor film casting process. Depending on the percent solids and the inherent viscosity of the solution, films in the wet thickness range of 8-20 mils were cast.

By following the casting procedure described below, the presence of defects within LARC-CPI films was minimized:
1. Allow the centrifuged polyamic acid solution to equilibrate in temperature for 1 hr before casting.
2. Transfer the required amount of polymer solution from the centrifuge tube to the clean, dry casting plate, using a large syringe. Prewarm the casting plate to 30° C. in a filtered air oven prior to use.
3. Cast the LARC-CPI wet film to a predetermined wet thickness in the range 16 to 35 mils using a motorized, clean doctor blade.

EXAMPLE 3—IMIDIZATION 3.1 Time and Temperatures

A Blue M Model DC2F6A (Class A) benchtop explosion-proof oven was employed within a filtered air, clean room environment. Table III depicts three of the principal drying cycles used to imidize LARC-CPI-BTDA films. These schedules, determined as a result of experimentation, correspond to maximum imidization temperature of 190°, 250°, and 275° C. The cure schedule for 300° and 315° C. films was identical to that for 275° C. except that the last stage involved holding the film at 300° or 315° C.

Use of a staged heating approach was found to be preferred because too rapid a heating rate caused solvent to be removed very rapidly, resulting in formation of bubbles and poor film quality. Conversely, too slow a cycle was impractical and not suitable for producing high quality film in volume.

Schedules similar to those shown in the table were also applied to LaRC-CPI-BTDA films imidized at other temperatures.

TABLE III

THREE OF THE PRINCIPAL DRYING SCHEDULES FOR LaRC-CPI-BTDA FILMS

| Cure Schedule A | Cure Schedule B | Cure Schedule |
|---|---|---|
| 85° C. 30 min | 85° C. 30 min | 85° C. 30 min |
| 150° C. 30 min | 150° C. 30 min | 150° C. 30 min |
| 190° C. 30 min | 190° C. 15 min | 190° C. 15 min |
|  | 250° C. 15 min | 275° C. 10 min |

3.2 Mechanical Properties of Fully Imidized as Cast Films

The determination of mechanical properties such as tensile modulus, tensile strength and so forth were determined using conventional procedures.

LaRC-CPI-BPDA possesses the highest strength and modulus and the lowest elongation, while ODPA-based LARC-CPI has a reasonably high modulus and strength and an exceptionally high elongation to break. LaRC-CPI-s-BPDA films showed the lowest strength and modulus, and an elongation approximately that of BTDA.

TABLE IV

DATA FOR FULLY IMIDIZED, UNORIENTED LaRC-CPI FILMS

| Polymer | Modulus (Ksi) | Strength (Ksi) | Elongation (%) |
|---|---|---|---|
| LaRC-CPI-ODPA | 470 | 19.6 | 29.2 |
| LaRC-CPI-BPDA | 373 | 15.8 | 8.0 |
| LaRC-CPI-BTDA | 574 | 20.2 | 6.7 |

3.3 Mechanical Properties of Unoriented Partially Imidized LARC-CPI Films

Figure 8A:
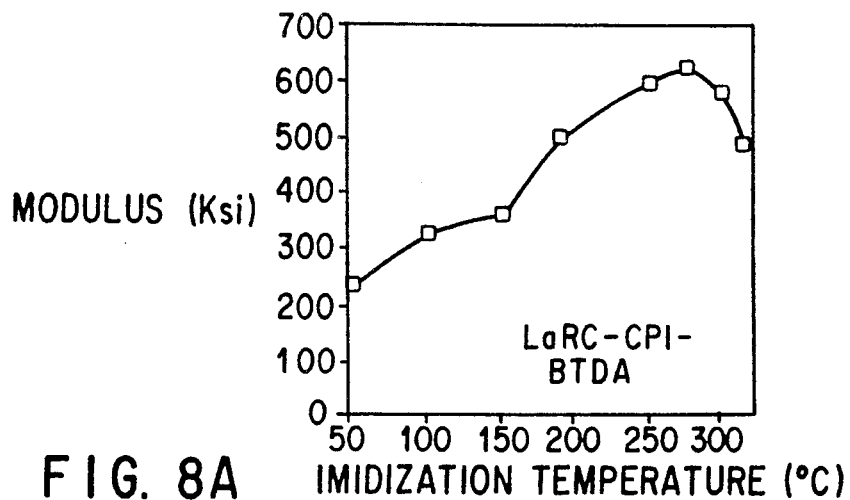
FIG. 8A is a graph of tensile modulus vs. percent imidization of unoriented LaRC-CPI-BTDA.
Figure 8B:
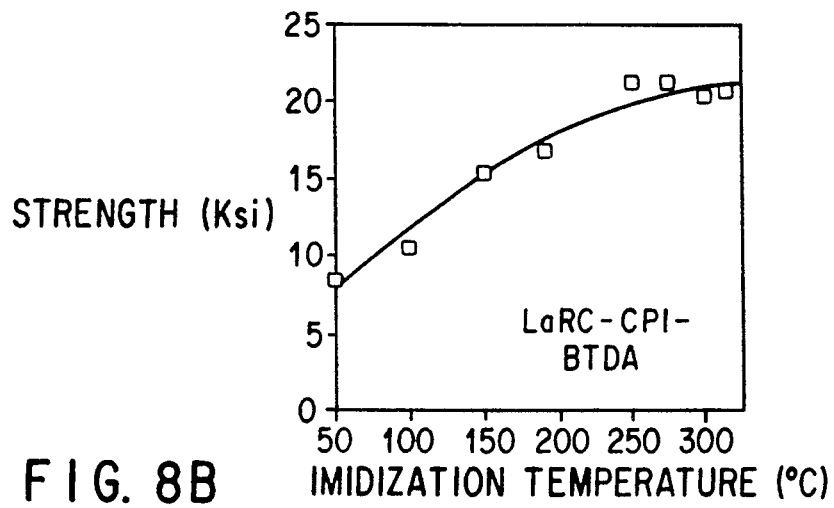
FIG. 8B is a graph showing tensile strength vs. percent imidization of unoriented LaRC-CPI-BTDA.
Figure 8C:
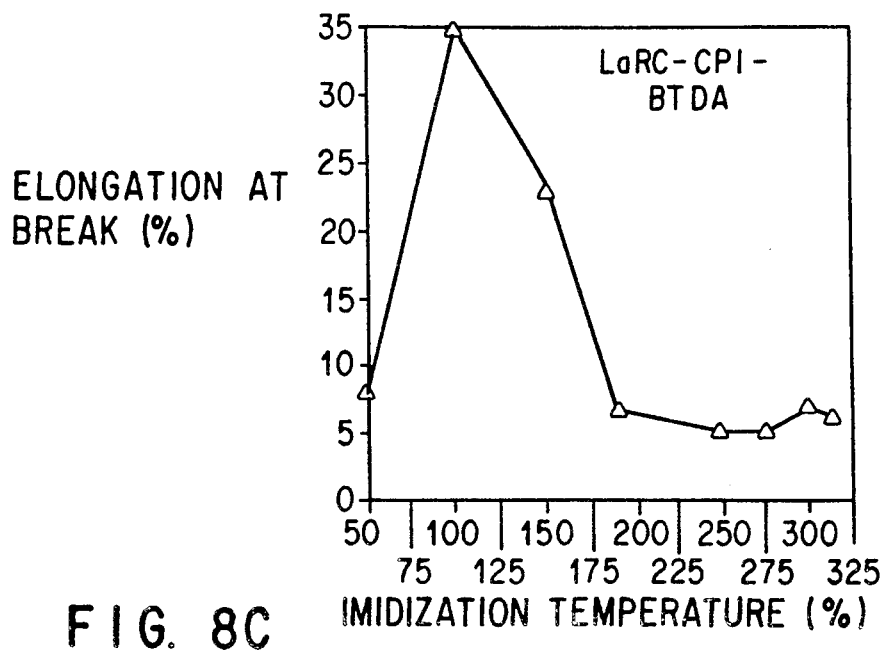
FIG. 8C is a graph showing tensile elongation vs. percent imidization of unoriented LaRC-CPI-BTDA.

As noted above, imidization and ring closure add to the rigidity of the LARC-CPI-BTDA molecule, resulting in a greater resistance to deformation. Conversely, the elongation-at-break is reduced. The strength of unoriented LARC-CPI film increases with increasing imidization temperature until it reaches a plateau. These data are depicted graphically in FIGS. 8A-8C. Tensile strength and modulus both increase with increasing temperatures of imidization. For unoriented films, these values reach a plateau. The room temperature curve of FIG. 8A shows several distinct features. First, modulus increases with increasing imidization temperature, slowly at first. Above a certain temperature, modulus rises more rapidly as percent imidization in the specimen increases. At still higher temperatures, a plateau is reached and the modulus of the unoriented material appears to fall. This may be due to degradation occurring in the polymer at or above 315° C.

In contrast to modulus and strength, the elongation of the unoriented LaRC-CPI-BTDA film begins low, increases rapidly and reaches a peak, and then drops and subsequently stabilizes. The behavior in the elongation curve is attributable in large part to the changing nature of the film as it undergoes imidization. At low temperature, the film being testing is actually a swollen system containing a high mass of solvent. The solvent allows the polyamic acid molecules (and the few polyimide molecules present at these temperatures) to slide fully within the film. Such a film has poor structural integrity and fails at low strains via chain slippage.

At the highest levels of imidization, on the other hand, there is much less solvent. Imidization and ring closure confer additional rigidity upon the molecule, resulting in a greater resistance to deformation. Hence, the molecules become more rigid and closely packed, and find it much more difficult to slide. In this situation, considerable barriers to large scale molecular motion exist. Any crystallization which may have occurred causes additional resistance to motion in the form of physical "crosslinks" among molecules. When a highly imidized film specimen is stretched, the restrictions to motion may cause the sample to fail at a low elongation via chain scission. At intermediate levels of imidization, the situation is more balanced. Here, some resistance to molecular motion exist. However, in this case there is enough mobility supplied by the solvent to keep the specimen from failing at low elongations by either mechanism (chain slippage or chain scission). The resistance to large scale motion increases rapidly in this highly complex system. At 150° C., a specimen elongation of 23 percent is possible. At 190° C., the maximum elongation is reduced to approximately 6 percent and remains at that level up through full imidization. 3.4 IR Spectrum and Extent of Imidization.

Figure 9B:
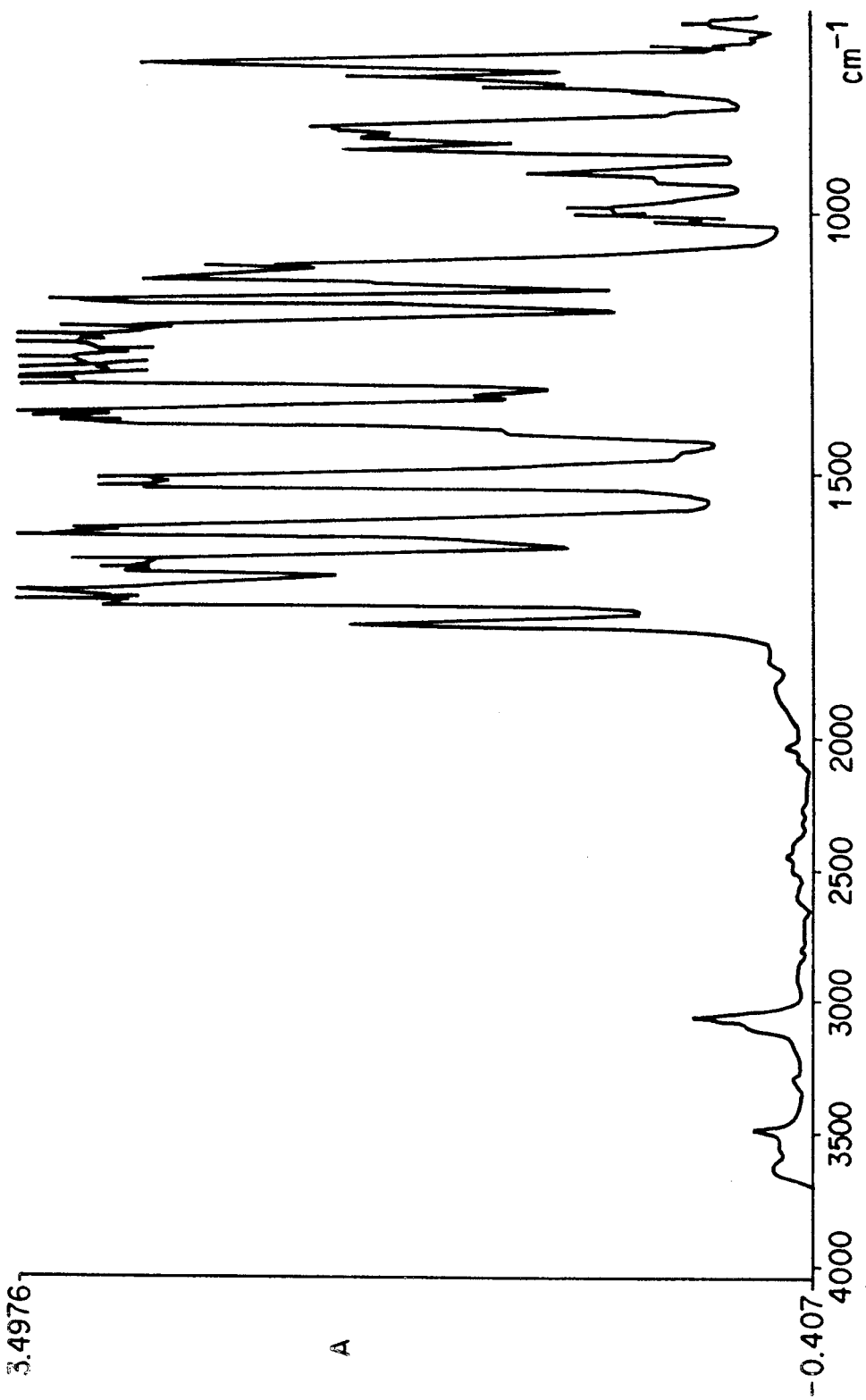
Figure 9C:
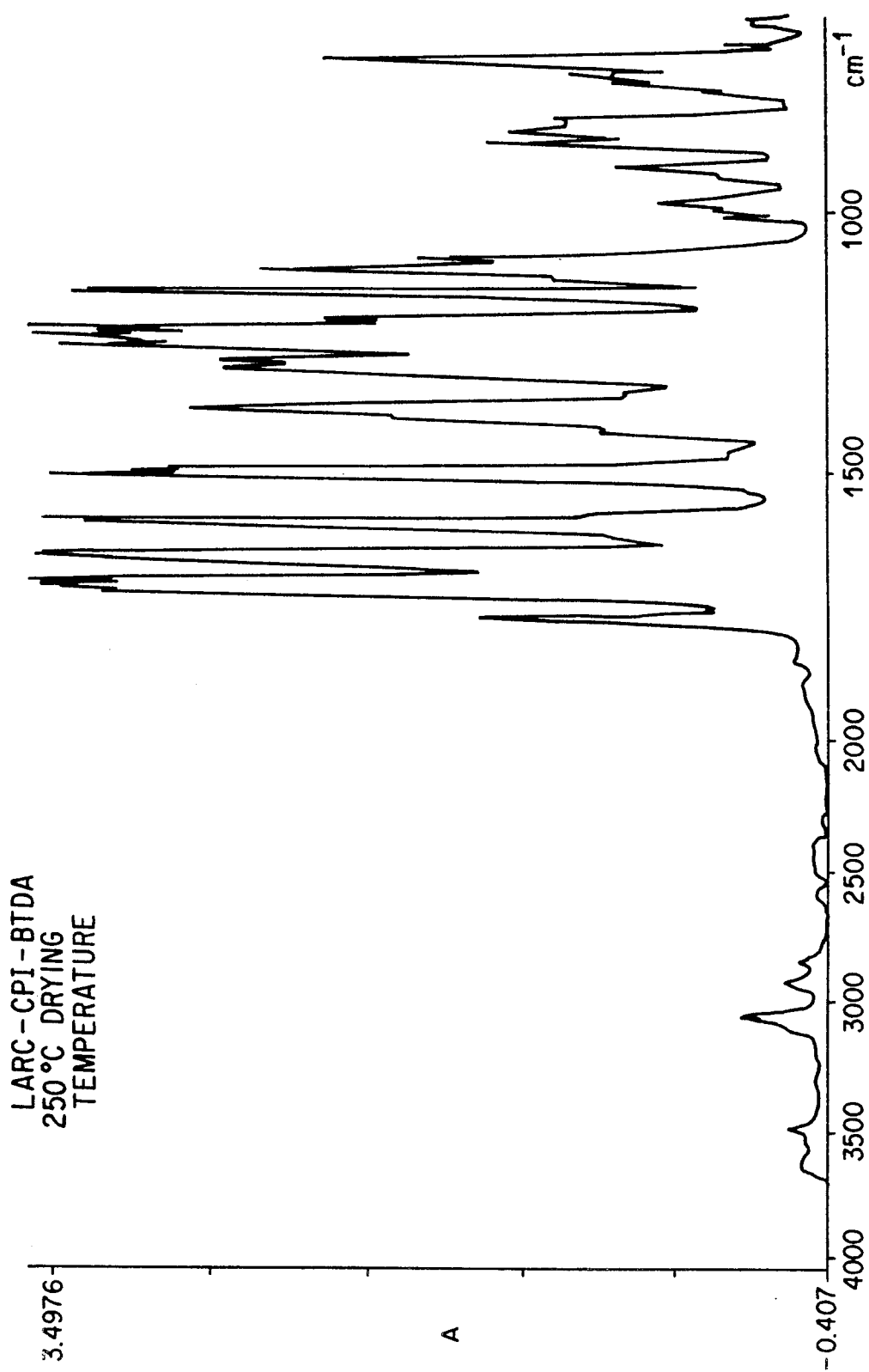
Figure 9D:
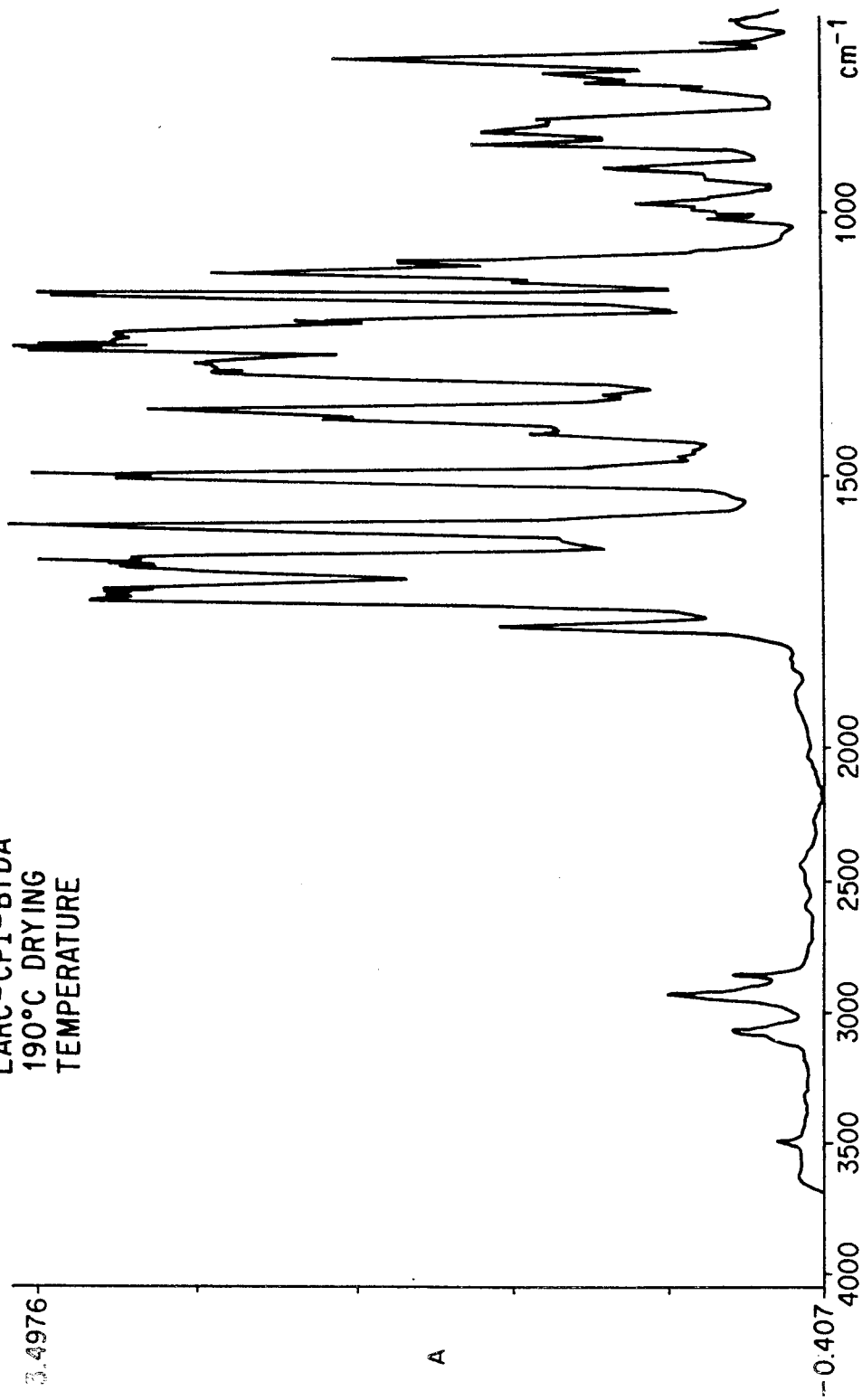
Figure 9E:
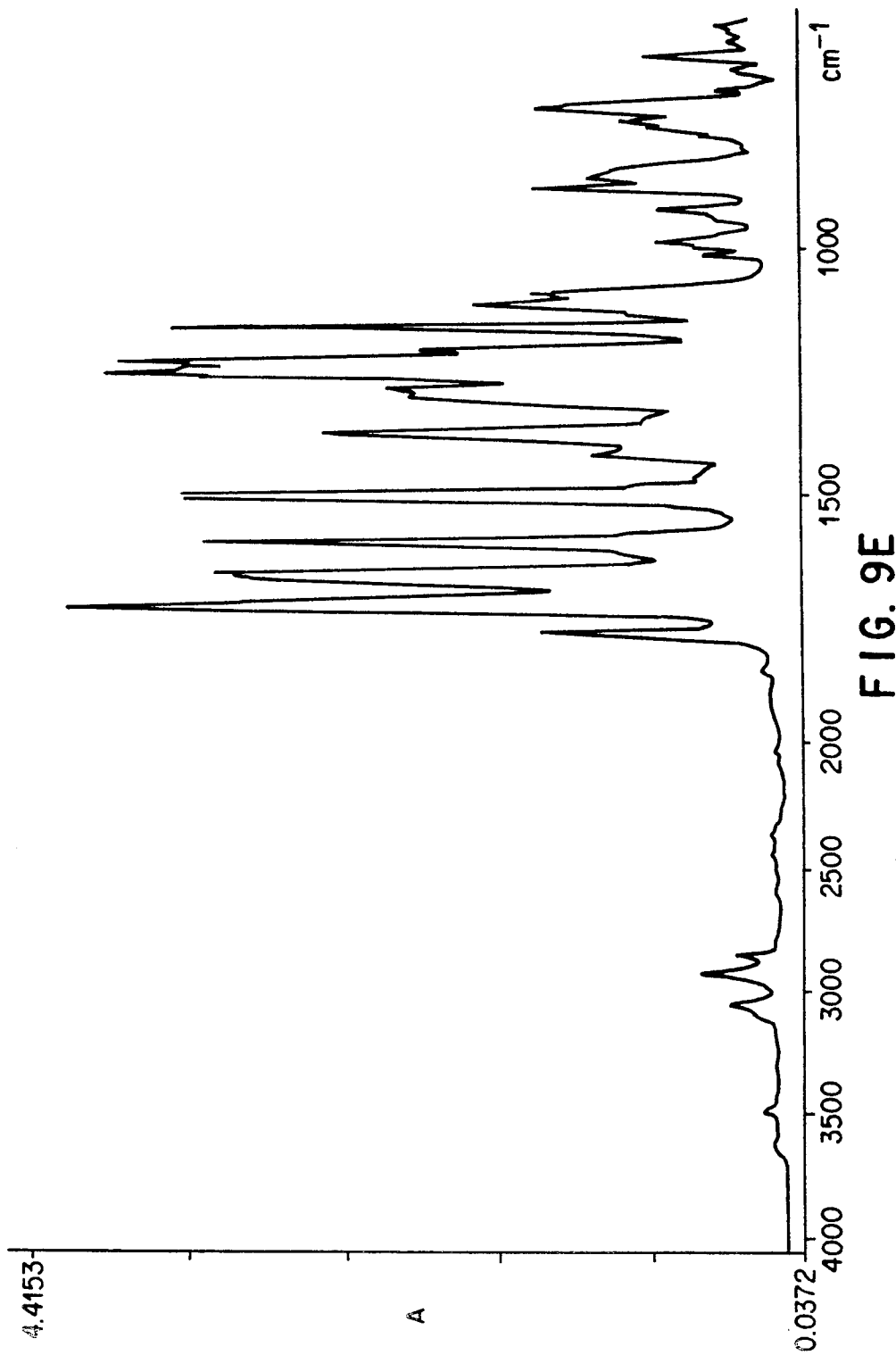
Figure 9F:
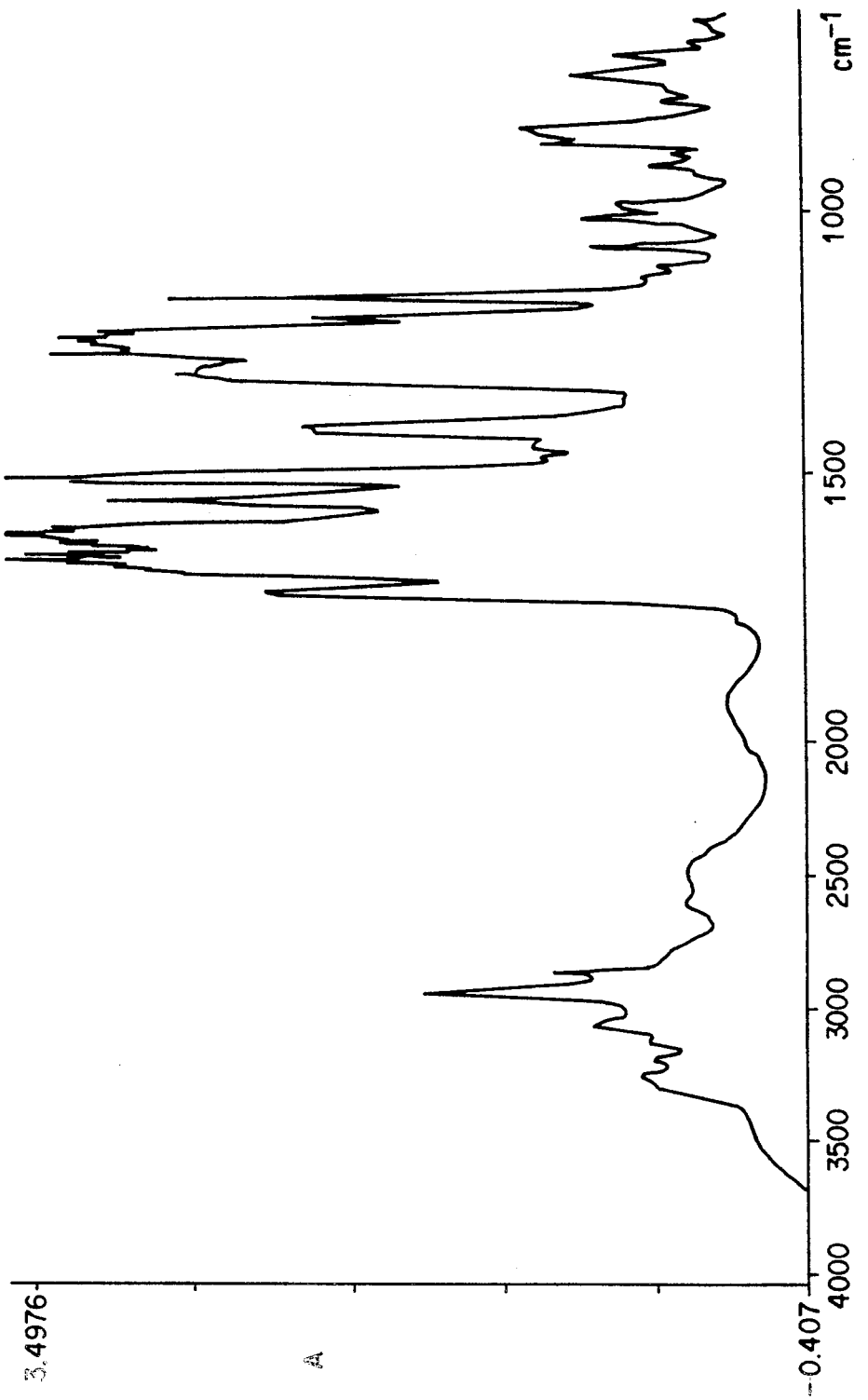

FIG. 9A shows a typical spectrum taken from a fully cured LaRC-CPI-s-BPDA film. Additional infrared spectra taken for other films at varying degrees of imidization are provided in FIGS. 9B-9F. The characteristic C=O carboxyl absorptions are seen in the 1,690 to 1,80 cm$^{-1}$ range. These correspond to the BABB ketone, the carboxylic acid carboxyl groups from the partially imidized polyamic acid, the amide carboxyl images on polyamic acid polyimide, and the imide carboxyl groups. The sharp imide absorption peak above 1,800 cm$^{-1}$ was used to measure the percent imidization within the films. A ratio was measured by using the imide peak and another sharp, constant intensity peak to eliminate the effects of variations in film thickness. Additional information was also obtained from the spectral region between 2,500 and 3,000 cm$^{-1}$ enable examination for the presence of residual solvent (DMAC or CHP) within the films following exposure at elevated temperatures.

EXAMPLE 4—ORIENTATION

4.1 Stretchability

Table V presents information on LARC-CPI in terms of initial imidization temperature of the film, stretching temperatures, and attainable draw ratio. Biaxial draw ratios up to 3× in each direction (9× total) and uniaxial ratios up to 4× were achieved.

TABLE V

RANGE OF FEASIBLE DRAWING AND IMIDIZATION TEMPERATURES

| Imidization Temperature (°C.) | Minimum Draw Temp. (°C.) | Maximum Draw Temp. (°C.) | Range of Draw Ratio |
| --- | --- | --- | --- |
| 50 | 50 | 75 | 1-2 |
| 100 | 110 | 140 | 1-3.5 |
| 175 | 180 | 230 | 1-3.5 |
| 190 | 195 | 233 | 1-4 |
| 250 | 250 | 300 | 1-4 |
| 275 | 275 | 325 | 1-4 |
| 300 | 222* | 335 | 1-4 |

*222 if amorphous, 300° C. if semicrystalline.

4.2 Full Imidization Prior to Stretching

Consider first the case of full imidization prior to stretching. In such a film, the polyamic acid has been converted entirely to polyimide. Moreover, virtually all of the solvent has been lost through drying treatments. The orientation process therefore begins with a film which has a high modulus and strength (and low elongation) in its unoriented state, as indicated by the data in Table VI. It is not surprising, then that such a film is difficult to orient and requires high temperatures to attain high draw ratios and mechanical property levels.

TABLE VI

BASELINE DATA FOR UNORIENTED LaRC-CPI FILMS AT VARIOUS DEGREE OF IMIDIZATION

| Polymer | Modulus (Ksi) | Strength (Ksi) | Elongation (%) | Imidization Temp(°C.) |
| --- | --- | --- | --- | --- |
| LaRC-CPI-BTDA | 328 | 8.36 | 8.4 | 50 |
|  | 326 | 10.5 | 34.9 | 100 |
|  | 357 | 15.3 | 23.1 | 150 |
|  | 494 | 16.7 | 6.4 | 190 |
|  | 590 | 21.2 | 5.1 | 250 |
|  | 620 | 21.2 | 5.0 | 275 |
|  | 574 | 20.2 | 6.7 | 300 |

The highest draw ratios achieved when stretching an as cast fully imidized film are shown below in Table VII. In the Table, the biaxial draw ratio is given in terms of the overall cross-sectional area reduction. Thus, stretching a polymer 2× in both directions (2×, biaxial) represents an overall area reduction of 4×.

The mechanical property levels which were obtained at these maximum draw ratios are shown below in Table VII. These values do not necessarily reflect the best properties obtained for these materials. Rather, they reflect the strengths, moduli, and elongation characteristic of stretching a fully converted polyimide film. As discussed below, the method of the present invention involving the stretching of partially imidized films results in much higher property levels.

TABLE VII

MAXIMUM DRAW RATIOS ACHIEVED WITH FULLY-IMIDIZED, AS-CAST FILMS

| Fully-Imidized Film | Uniaxial Draw Ratio | Biaxial Draw Ratio |
| --- | --- | --- |
| BTDA | 3.3x | 2.25x (1.5x ea) |
| s-BPDA | 2.0x | 3.06x (1.75 ea) |
| ODPA | 2.75x | Not tested. |

TABLE VIII

MECHANICAL PROPERTY LEVELS ASSOCIATED WITH MAXIMUM DRAW RATIOS

| Uniaxial Properties of Fully | Average Biaxial Properties of Fully Imidized Films at Highest Draw |

TABLE VIII-continued

MECHANICAL PROPERTY LEVELS ASSOCIATED WITH MAXIMUM DRAW RATIOS

| | Imidized Films | | | Ratios | | |
|---|---|---|---|---|---|---|
| Film | Strength (Ksi) | Modulus (Ksi) | Elongation (%) | Strength (Ksi) | Modulus (Ksi) | Elongation (%) |
| BTDA | 35.8 | 880 | 5.5 | 19.8 | 455 | 6.8 |

4.3 Partial Imidization Prior to Stretching

LARC-CPI-BTDA was partially imidized, stretched at various temperatures, and tensile properties tested. For these films, the hot shoe was used to aid in evaluating stretch temperature. The lowest stretch temperatures usable for the 190°, 250°, and 275° C. films were found experimentally to be in the range of 225°, 245°, and 271° C. Lower temperatures could sometimes be used but would result in excessive film breakage, while temperatures considerably higher led to slippage of molecules past one another and reduced orientation.

In one set of experiments, LARC-CPI-BTDA was imidized at maximum temperatures of 190 and 275° C. and drawn biaxially at a rate of 1 inch/sec. in the Long stretcher to a biaxial draw ratio of 2× by 2× (total draw ratio: 4). The resulting data are shown for comparison in Table IX together with values for unoriented control specimens. The last column includes the properties of LARC-CPI-BTDA drawn biaxially in its fully imidized condition, as noted earlier, for purposes of comparison.

These studies show the effect of percent imidization on properties. That is, the control imidized at 275° C. has mechanical properties which exceed those of the control imidized at the lower temperature.

Second, the effect of increasing the draw ratio is positive in both cases but varies in degree depending upon the stretch temperature. In this case, drawing after imidizing at 190° C. (the level of imidization here is still relatively low) readily allows for a change in shape (cross-sectional area reduction by 4×) but results in only a modest improvement in properties (8 percent in strength). In contrast, drawing after imidizing at 275° C. results in a larger percentage improvement in all mechanical properties when compared to the controls. Although the degree of imidization is considerably higher here, there is still sufficient solvent to allow orientational motion. Identical draw ratios are thus not the same in terms of their effect on film properties if they are attainable by different routes. In particular, drawing at low degrees of imidization can result in more molecular flow and less orientation than drawing a higher temperatures.

The third point to be made is that drawing at less than full imidization can produce properties superior to films drawn after being fully imidized. This is due to the enhanced mobility of molecules within the film at the lower temperature. In this case, the 275° C. film was able to draw to a higher overall draw ratio than the the fully imidized film, and do so more effectively.

In another set of experiments, LARC-CPI-BTDA was imidized at a maximum temperature of 250° C., and then stretched to 3.2× uniaxially on both the web stretcher and the Long stretcher. The imidization reaction was then completed, and again pairwise comparisons were made. The results for the Long stretcher, which provides balanced properties of great interest in commercial practice, are shown in Table X. Similar trends with treatment were observed for the web stretcher.

Several points are reinforced by this table. First, stretching to a higher draw ratio (in this case, 3.2×) again considerably improves film properties when compared to the undrawn control. Second, completing the imidization reaction after stretching can result in very high property improvement (Here, raising the modulus from 965 to 1,410 Ksi). Third, drawing material in a partially imidized state and completing the imidization reaction can produce properties which considerably exceed the best available by drawing fully imidized material. In this case, the strength (47.8 vs. 35.8 Ksi), modulus (1410 vs. 880 Ksi), and elongation (8.3 vs. 5.5 percent) all exceed the highest value obtained for LaRC-CPI-BTDA drawn uniaxially after full imidization. The processes of the present invention have resulted in significant physical structural differences.

TABLE X

LaRC-CPI-BTDA FILM, UNIAXIAL 3.2x (LONG STRETCHER)

| Property | As Cast And Imidized at 250° C. | 250° C. Imidized, then Stretched | 250° C. Imidized, Stretched, then 300° C. Imidized | 300° C. Imidized and Stretched |
|---|---|---|---|---|
| Tensile Strength (Ksi) | 21.2 | 39.2 | 47.8 | 35.8 |
| Modulus (Ksi) | 594 | 965 | 1410 | 880 |
| Elongation (%) | 5.1 | 8.8 | 8.3 | 5.5 |

TABLE IX

LaRC-CPI-BTDA SPECIMENS STRETCHED 2x BY 2x, LONG STRETCHER

| Property | Control Imidized to 190° C. | Imidized to 190° C. Stretched (2x × 2x) | Control Imidized 275° C. | Imidized to 275° C. Stretched (2x × 2x) | Drawn Fully Imidized (1.5x × 1.5x) |
|---|---|---|---|---|---|
| Strength (Ksi) | 14.9 | 16.1 | 23.1 | 28.2 | 19.8 |
| Modulus (Ksi) | 491 | 628 | 522 | 765 | 455 |
| Elongation (%) | 3.65 | 4.84 | 6.31 | 9.1 | |

EXAMPLE 5—DSC STUDIES

A Perkin-Elmer Model (DSC-7 was used. This apparatus is controlled by PC Series Perkin-Elmer software running on an IBM/PS/2 model 50 computer. The unit consists of the calorimeter which is seated in a contained water cooling bath, a high-purity nitrogen purge, an instrument control unit (Perkin-Elmer model TAC-7/PC), a Perkin-Elmer Graphics Plotter 2, and the PS/2 computer. With this apparatus, temperature can be controlled from room temperature 600° C.

Figure 10A:
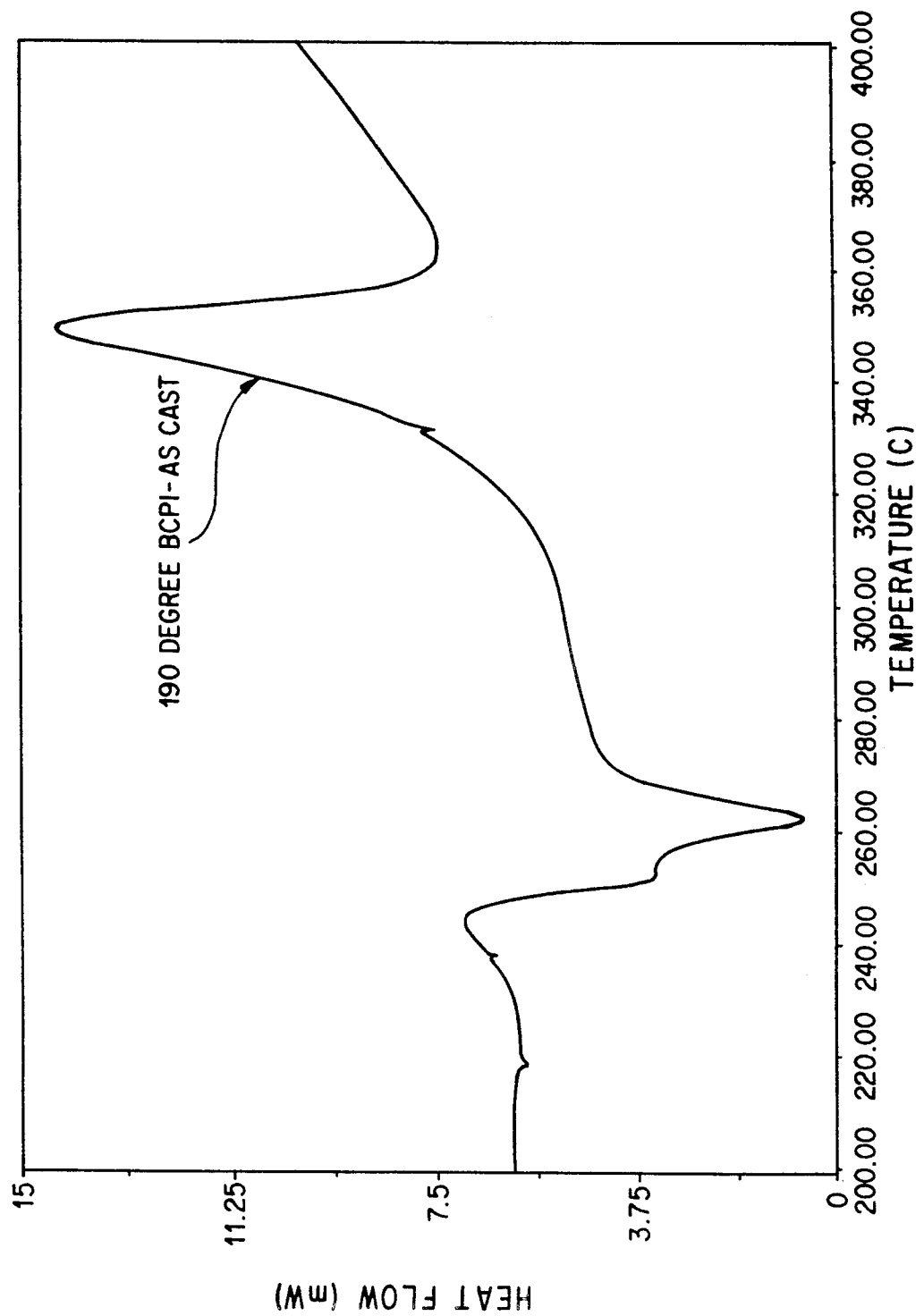
FIG. 10A shows a DCS thermogram for a LaRC-CPI-BTDA film of the present invention, imidized to 190° C.
Figure 10B:
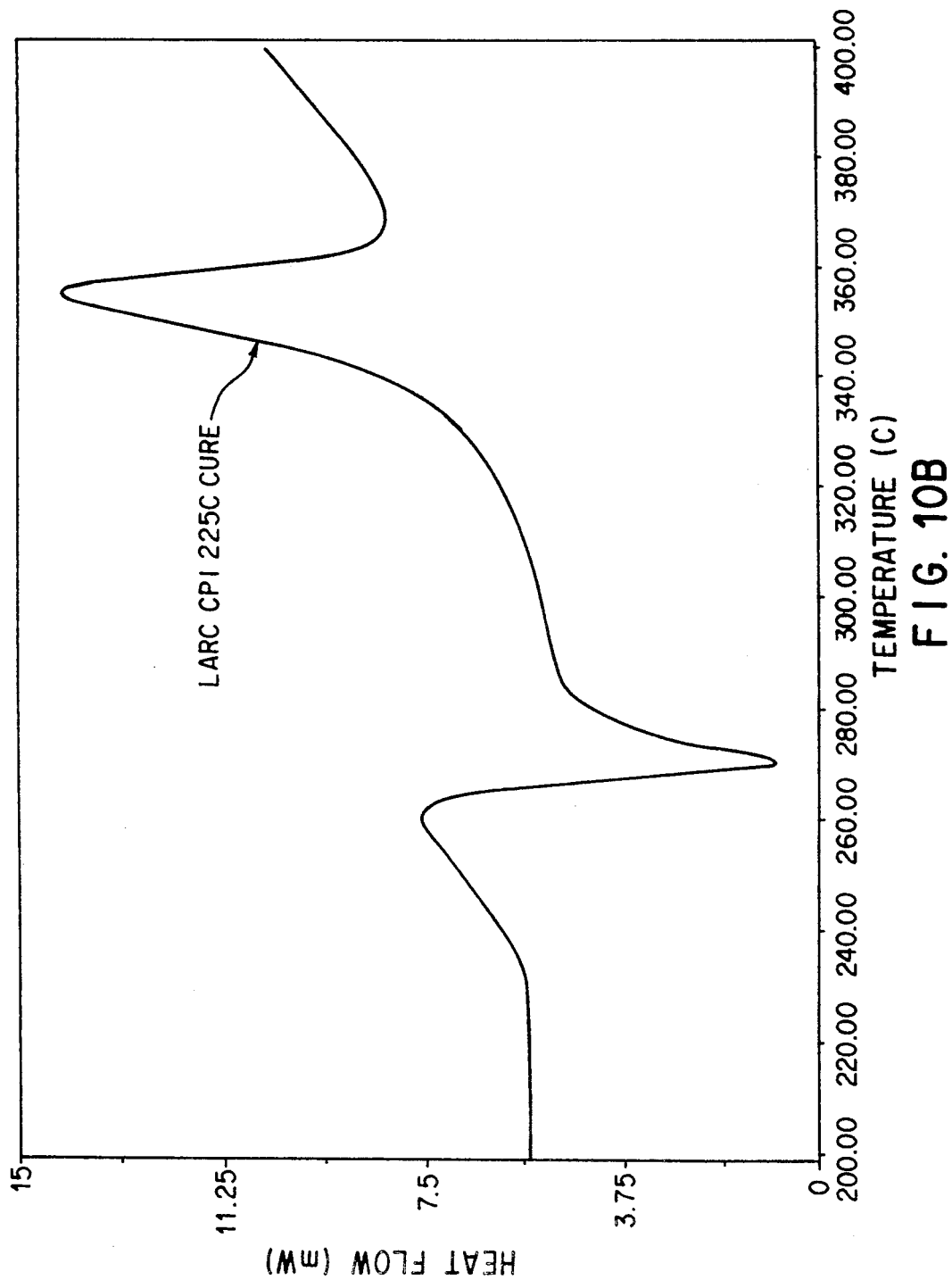
FIG. 10B shows a DCS thermogram for a LaRC-CPI-BTDA film imidized to 225° C.
Figure 10C:
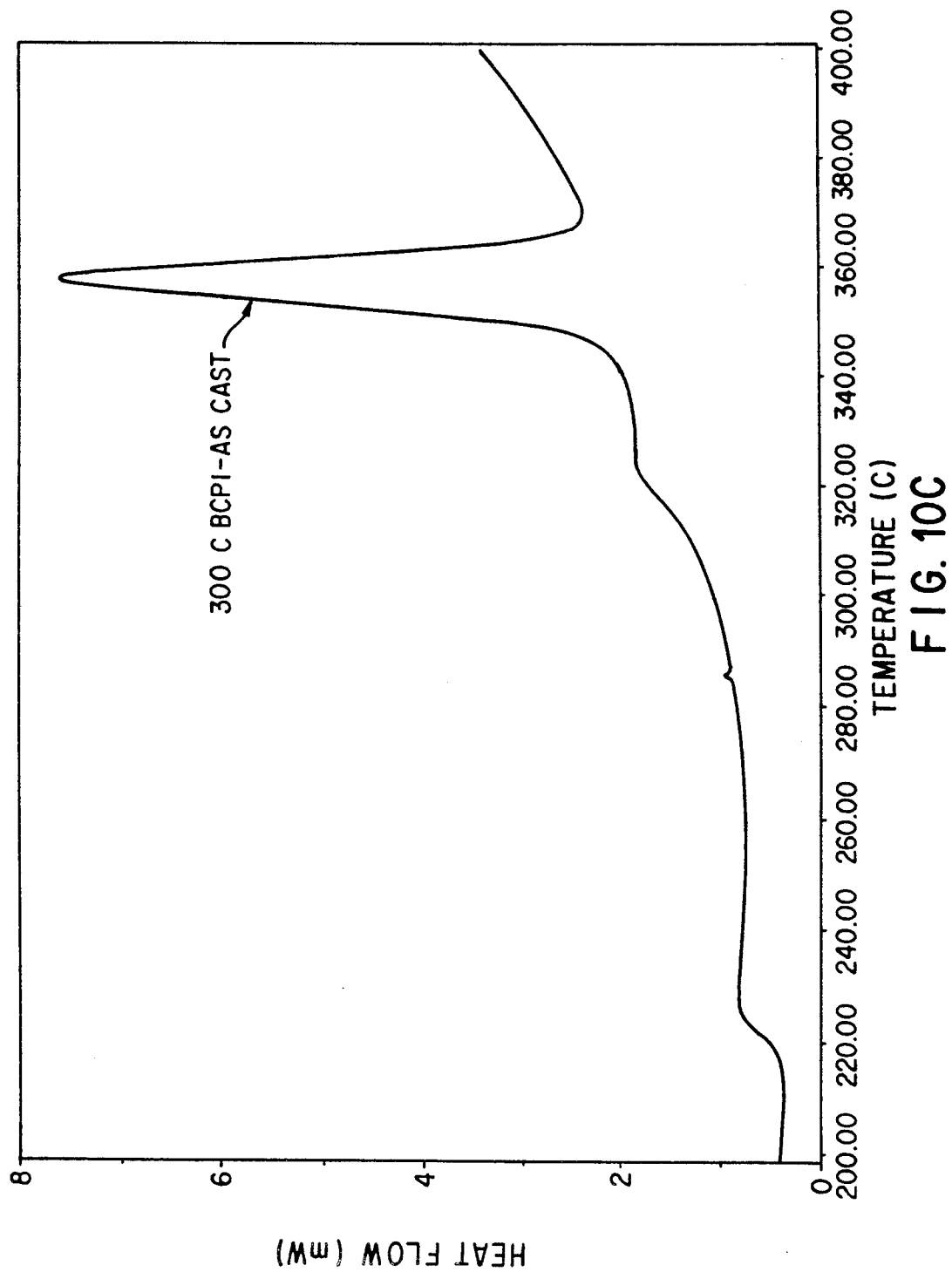
FIG. 10C shows a DCS thermogram for a LaRC-CPI-BTDA film imidized to 300° C., i.e., completely imidized.

All samples were tested using conventional procedures. Fully imidized LaRC-CPI-s-BPDA films were examined from room temperature to 400° C. at a rate of 10° C./min. This film showed a Tg at 217° C., with an associated changed in specific heat of 0.18 J/g-C. A second heating of these films revealed an upward Tg shift to 224° C. It was also determined that the Tg of films biaxially oriented by a factor of 2× shifted upward to 233° C. The increase of glass transition temperature with orientation normally arises in oriented polymers due to the closer molecular packing which occurs during the process. DSC thermograms obtained for various LaRC-CPI-BTDA films are shown in FIGS. 10A to 10C.

DSC work was conducted on LARC-CPI-BTDA films in various states including partially and fully imidized films, as well as annealed and quenched films. Fully imidized, unoriented LARC-CPI-BTDA films exhibit a glass transition temperature of 221° C. It should be noted, however, that it was difficult to discern this Tg in partially imidized films (those imidized up to 250° C.). The glass transition for these materials was not distinguished, instead being masked as described below. Films rendered amorphous by heating to 400° C. and then quenching were found to have a Tg of approximately 226° C.

In those films not fully imidized, an endotherm appeared at approximately 250° C. which was followed shortly by an endotherm of similar magnitude. This feature, particularly the endotherm may be indicative of the onset of the large-scale imidization reaction. After heating above 300° C., this feature disappeared in all cases, consistent with a thermodynamically irreversible process. The endotherm shifted toward higher temperatures with films cured to higher temperatures, and its magnitude decreased with imidization temperature. Examples of DSCs for LaRC-CPI-BTDA films imidized to 190, 225 and 300° C. are shown in FIGS. 10A to 10C respectively. The exotherm immediately following the lower endotherm may be associated with the onset of crystallization.

A most striking feature of the LARC-CPI-BTDA calorimetry curves was the large crystalline melt peak. This peak appears at 352° C. as a single-peaked endotherm. The position of the peak maximum did not change with imidization conditions, up to and including 300° C. imidized films. In one study it was determined that the latent heat of fusion of a perfectly crystalline LARC-CPI-BTDA film would be approximately 130.4J/g. Our cast LaRC-CPI-BTDA films generally showed a latent heat of fusion of 18-32 J/g, indicating that cast CPI film is approximately 15-22 percent crystalline.

Heating of LARC-CPI-BTDA film samples in the DSC to above the melting temperature (Tm), cooling, and subsequently reheating showed that the crystalline nature of the film exhibited a hysteretic effect. In our DSC effort, no Tm was evident in film which had been previously melted.

Figure 11:
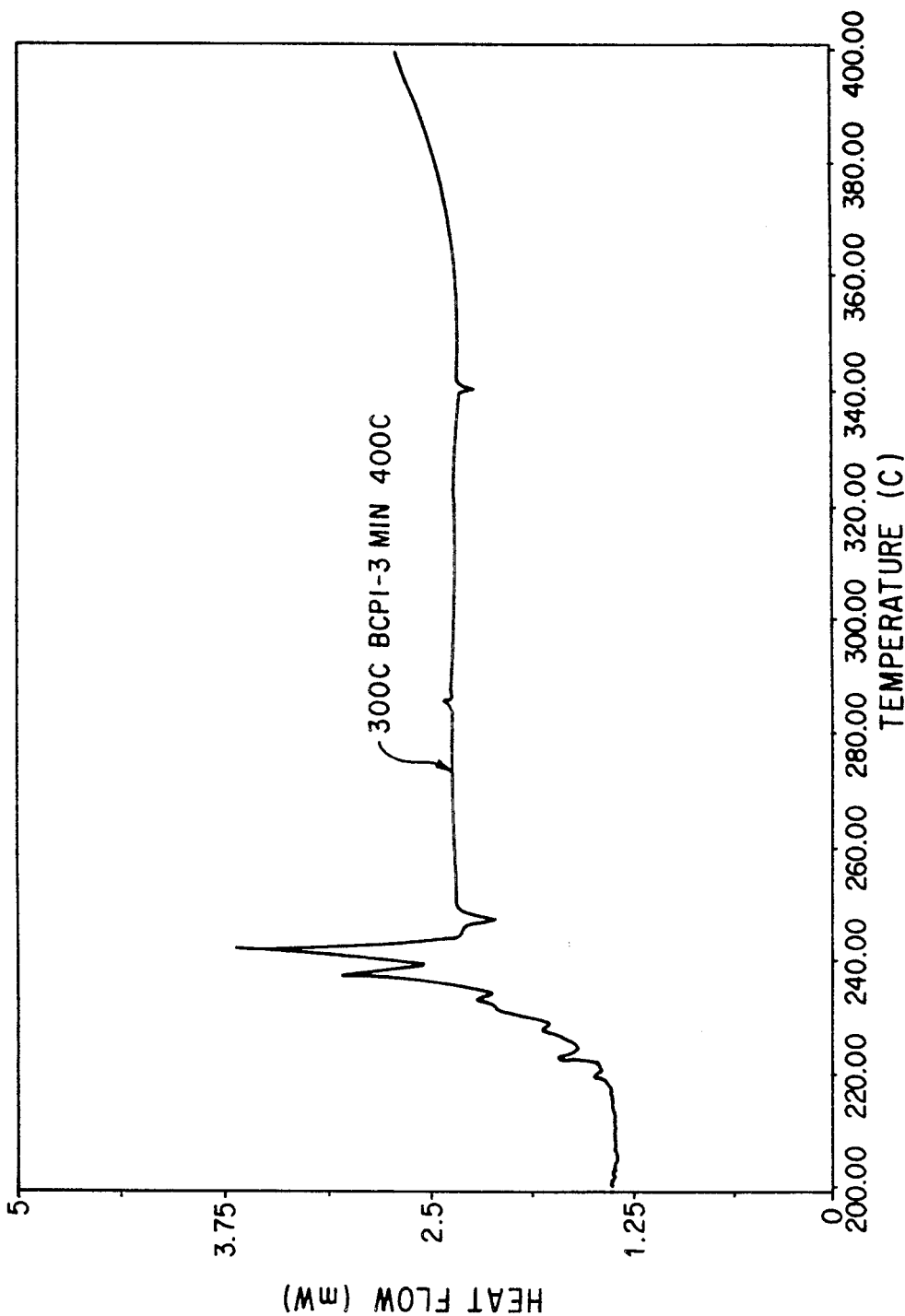

This discovery helped point the way to processing using amorphous, fully-imidized film and recrystallizing these films after orientation. A DSC for a fully imidized LARC-CPI-BTDA film which was heated to 400° C. and quenched to a totally amorphous state is shown in FIG. 11.

By combining uniaxial orientation of the film and then annealing at 300° C., it was possible to regain crystallinity in the film (FIG. 12). Here, it was determined that applied tension was important to the annealing process. Although the oriented films would crystallize with annealing, longer periods of time (2 hr compared to 1) would actually reduce the size of the endotherm from 25 to 19J/g, possibly indicating that the film relaxed as it was heated and lost some structure. When property tensioned, films could be made to recrystallize with an endotherm of up to 27J/g. Melting temperature in these films occurred at a slightly lower temperature (343° C.) than that for films which had never been rendered amorphous, indicating a lower degree of crystalline order. Annealing at a temperature higher than 300° C. would undoubtedly lead to more crystalline perfection, but at the cost of reducing orientation and associated mechanical properties.

EXAMPLE 6—CRYSTALLINITY AND X-RAY MEASUREMENT

6.1—WAXS

For the traditional WAXS measurements performed at room temperature, a Rigaku RU-300 rotating anode generator, with Cu Kα radiation (1.54 Angstrom wavelength) and a diffracted beam graphite monochromator. The diffraction intensity was measured in the $2\theta$ range from 3 to 43 deg at a scan rate of 1 deg/min. Some scans were performed in reflection and some in transmission mode.

For the real-time measurements, the Brookhaven National Synchrotron Light Source was used to provide a high intensity source of x-radiation. Here, the SUNY X3-A2 beam line was used to produce x-rays of a wavelength of 1.54 Angstroms. The system was equipped with a Kratky slit collimator, an evacuated flight path for small angle x-ray scattering, and a Bruan one-dimensional position sensitive detector. Real-time experiments were performed in transmission mode.

Room temperature WAXS results were performed on LARC-CPI-BTDA initially imidized at maximum temperatures of 100 and 190° C. The various crystalline samples were examined to determine the positions of the scattering peaks, their full width at half maximum (FWHM), and to calculate area under their peaks for determination of percent crystallinity. Not all peaks were found in all films. In particular, when the films exhibited ordered structure, additional strong peaks were seen at very low angle (large d-spacing). Because the unit cell structure has not yet been deduced for LARC-CPI polymer, it was not possible to assign Miller indices to the different diffraction lines. However, it was possible to deduce the level of order due to processing and to successfully determine the degree of crystallinity for each film.

FIG. 13 presents results for LARC-CPI-BTDA film which has been subjected to three different treatments. Curve I depicts the intensity scan for film imidized at 100° C. This film appears to be fully amorphous and there is no evidence of splitting into peaks characteristic of crystalline habit.

In curve 2 of FIG. 13, the intensity scan for film processed to a maximum temperature of 190° C. is depicted. Here, several crystalline reflections are apparent. For this film the scaled amorphous halo was subtracted from the total scattered intensity of the semicrystalline material, resulting in a calculated degree of crystallinity of approximately 12 percent. This material was heat treated at 255° C. for 4 hr. This resulted in an increase in the degree of crystallinity to 18 percent and an increase in percent imidization in accordance with the data discussed earlier. Increasing the crystallization treatment temperature to 300° C. resulted in raising the degree of crystallinity Xc, further, to a level of 28 percent. Data for the degree of crystallinity of these cold crystallized samples together with their density is presented below in Example 7, and in Table XI.

In addition to the cold crystallized samples, effort was directed toward evaluating the percent crystallinity of CPI samples originally imidized at 190° C. and subsequently crystallized under controlled conditions in N-methyl pyrrolidone (NMP). The purpose of this was to increase the degree of crystallinity to provide a better extrapolated value for the heat of fusion of 100 percent crystalline material.

These films were first rendered amorphous by heating above the melting point, followed by quenching in water. Then, the specimen was raised to 195° C. and held for different times in NMP in an argon environment. They were then brought to the room temperature by quenching in water and allowed to reside in water for 2 hr to remove the NMP. Subsequent infrared analysis showed no residual NMP in these solvent-crystallized films. Following this, two drying treatments were used. In the first, films were dried while constrained between plates. In the second, they were dried freely with no restraint.

FIG. 14 presents WAXS scans for the constrained LARC-CPI-BTDA films. The constraint, which involved drying between ceramic fitted disks, was employed in order to make these films flat for x-ray analysis, since otherwise these specimens tended to curl in the solvent and were difficult to use in the sample holder. The figure shows data for two different films, with Curve 1 taken in reflection mode and Curve 2 in transmission mode. Since LARC-CPI appears to have a high absorption coefficient, reflection geometry should be more sensitive to the surface microstructure while transmission mode reflects the bulk morphology. Although the exposure time in NMP for the two films was different, the actual differences in the diffraction pattern are characteristic of the diffraction geometry and not of the treatment time. Several peaks contribute strongly to scattering in reflection but only weakly in transmission. This means that there is a tendency for an in-plane orientation to occur as a result of the constrained drying of solvent-crystallized films. The freely dried films, in contrast, showed no differences between reflection and transmission mode, and the patterns are similar to the cold crystallized films.

In addition to the room temperature WAXS results, several real-time x-ray scans were completed. To study the time development of crystallinity, partially imidized but noncrystalline LARC-CPI-BTDA film imidized at 100° C. was employed. WAXS results were recorded over a 2θt? range of approximately 30 deg, for a count time of 100 sec/scan. This long count time was required because the diffracted intensity is low, and the detector supplied at the beam line was not sensitive enough for short time exposures. FIG. 15 presents four scans of real-time x-ray intensity vs. channel number at temperatures of 35° C. (Curve 1), 200° C. (Curve 2), 250° C. (Curve 3), and 300° C. (Curve 4). The edge of the beam stop blocking the main beam intensity is located near channel 700 and the main beam position is on the right hand side of the figure. Scattering angle increases from right to left on the abscissa.

As is evident, this initial 100° C. imidized film is amorphous at 35° C. and appears to remain amorphous as the temperature is rapidly raised to 200° C. At this temperature the film is undergoing imidization, and solvent is being expelled. Due to the rapid increase in temperature from 35 to 200° C., the chains seem to be in too rapid a state of flux to result in a highly ordered crystalline structure. As the temperature is further raised to 250° C., the peak of the diffraction pattern becomes narrower and shifts to lower scattering angle (higher channel number, higher d-spacing) due to thermal expansion of the amorphous lattice. The peak narrowing corresponds to the formation of paracrystalline structure. By the time the temperature has increased to 300° C., the film shows a very distinct crystalline structure, with the largest peak occurring at channel number 700. This peak corresponds to the peak at 18.5 degrees in FIG. 13.

The importance of thermal history and residence time above 200° C. in developing crystallinity can be seen by comparing FIG. 15 with FIG. 16. The 100° C. imidized LARC-CPI-BDTA film was heated quickly to 200° C. (Curve 1) as before, but subsequent scans were taken every ten degrees from 250° C. to 300° C. This effectively increases the residence time at elevated temperature compared to the previous test described above. The material was amorphous at 200° C. and remained amorphous through the 270° C. scan (not depicted). Some structural development is evident beginning at 280° C. (Curve 2). A small peak begins to emerge at channel number 688 which sharpens but does not grow substantially at 300° C. (Curves 3 and 4). The recooled material of Curve 5 shows two broad, small peaks which indicates that this sample is still of very low degree of crystallinity. When combined with the SAXS data, discussed below, these data provide some insight into methods for fine tuning the processing of LARC-CPI film.

6.2—Small Angle X-ray Scattering (SAXS) Results

SAXS scans were obtained under the identical heating conditions used for the WAXS results depicted in FIG. 15. The SAXS data at different temperatures are depicted in FIG. 17 and show that, at 100° C., there is no scattered intensity in the range of 46 to 525 Angstroms. Some intensity is observed in near the beam stop edge at both 200° C. and 250° C., but no clear peak is evident. At 300° C., at the same point where Curve 4 of the WAXS results shows clear crystal structure, the emergence of a distinct shoulder is evident in the SAXS scan.

FIG. 18 indicates SAXS data for the specimen at 300° C. over time. The heat treatment provided essentially constitutes annealing of the film. As can be seen, the shoulder becomes more distinct with time, ranging from almost no evidence at 0 min to a well-defined peak after 40 min of exposure. This position in the SAXS and represents a periodicity of approximately 249 Angstroms and most probably represents a structure which has alternation between stacks of lamellae and a region of amorphous chains.

It can be seen that in the WAXS data (which reflects short-range order) no change in either peak position or intensity with residence time at 300° C. was seen. In contrast, the SAXS data indicates that the long-range order of the structure continued to evolve, with the structure becoming a more perfect system as the time at 300° C. was increased.

EXAMPLE 7

The density measurements were done in conjunction with x-ray and differential scanning calorimetry measurements on LARC-CPI-BTDA films imidized initially at a maximum temperature of 190° C. This material was treated at a series of different temperatures for 4 hr. Table XI defines the treatments and associated densities. Each measurement represents the average of three to five pieces of film from a given preparation. This provided additional data from which to attempt to determine the 100 percent amorphous crystal phase densities. Density of the amorphous component, based on measurements taken for a completely amorphous film, resulted in an amorphous density of 1.335 gm/cc.

TABLE XI

DEGREE OF CRYSTALLINITY AND DENSITY OF COLD CRYSTALLIZED SAMPLES

| Sample | Xc (%) | Density (g/cc) |
|---|---|---|
| CPI-190-AM | 0 | 1.335 |
| CPI-190-AR,1 | 10 | 1.343 |
| CPI-190-AR,2 | 14 | 1.359 |
| CPI-190-255,1 | 18 | 1.365 |
| CPI-190-255,2 | 19 | 1.366 |
| CPI-190-266,1 | 22 | 1.369 |
| CPI-190-266,2 | 24 | 1.376 |
| CPI-190-300 | 28 | not measured |

It was not possible to directly measure the density of fully crystalline material due to the existence of a third, rigid amorphous phase (described in more detail in Example 5 above on DSC). In a two phase approach, the density and x-ray crystallinity Xc are normally related by the following equation:

$$P = paXa = PcXc$$

where
P = sample density
Pa = density of fully amorphous specimen
Pc = density of fully crystalline specimen
Xa = amorphous fraction = 1 − Xc For a three-phase system, a third term must be added and the sum of the amorphous and crystalline fractions no longer equal unity. A tentative assignment of a crystalline density of about 1.51 gm/cc was made possible by extrapolating the curve of FIG. 19, which plots measured x-ray crystallinity vs. density.

As a result of this effort, an approximate relationship between crystallinity and density was established, and an absolute value for the density of the amorphous phase of LARC-CPI film imidized at 190° C. was determined. Moreover, as a result of the studies involving x-ray and DSC measurements, it was concluded that a three-phase model is required to represent the structure of LARC-CPI. This is not surprising. The need for more than a two-phase model to describe structural behavior has been documented for other materials such as PEEK, and may be characteristic of high performance crystalline thermoplastics.

EXAMPLE 8—ORIENTATION OF FULLY IMIDIZED POLYIMIDE FILM.

8.1 Producing Amorphous Film

The route to fully amorphous LARC-CPI-BTDA films involved heating the fully imidized film to elevated temperature followed by quenching rapidly to eliminate the potential for formation of crystallite nucei upon cooling. Initial experiments involved placing an 8 in. × 8 in. sample of fully imidized film into a tenter frame and placing this frame between the platens of a press. In an effort to keep the polymer from degrading at higher temperatures, initial experiments were aimed at heating the polymer to no more than 375° C., approximately 20° C. above the melting temperature of the polymer. Films were heated at 10–15 min. at this temperature and quench-coolded to room temperature. DSC examination of these films revealed that there was still some residual crystallinity. Accordingly, the temperature press setting was raised further to 400° C., and the film was quench cooled from this level. DSC and x-ray examination of these films indicated no crystallinity.

A key objective then became to determine the minimum time at elevated temperature which was required to eliminate the crystallinity prior to quenching. This minimum time was important from two standpoints. First, it assured that minimum degradation of polymer would occur. Second, it is a goal of commercial processing operations to achieve as high a throughput as possible, which necessitates minimum processing time wherever possible. During the course of these experiments it was thought that the 10–15 min time period might cause major changes in the polymer such as cross-linking of the CPI molecules themselves. This theory was borne out in later stretching experiments in which the film, after exposure for this period at high temperature, appeared to have characteristic elastomeric properties of recoverability and retactibility (rebound) from large-scale deformation.

To determine the minimum time required at high temperature to eliminate crystallinity prior to air quenching, a film of fully imidized film was cut into discs which were 3 in. in diameter. These discs were placed into circular tentering frames, fastened and closed. The press was preheated to 400° C. and the frames were placed in the press for periods of 1, 2, 3, 5, 10, and 15 min. The frames were then withdrawn from the press and each film was removed from its frame as rapidly as possible to avoid thermal overexposure.

Samples from the center of each film disc were then examined using the DSC. The unquenched film exhibited a large crystalline melt peak at 357° C., consistent with previous experimentation. The peak was virtually gone, however, after only one minute of exposure to the higher temperature, being reduced from 18.69 joules/gram to 0.72 joules/gram. Sample exposure for 2 min showed essentially zero crystallinity but appeared to be at the point of incipient crystallization. Samples exposed for three and 5 min showed no vestiges whatsoever of crystallinity and were completely amorphous. Since the films exposed for 2 min (120 sec) showed essentially zero crystallinity but was near incipient crystallization, this time period was taken as the benchmark and increased slightly to assure no nuclei were present. Subsequent films needed for stretching on the program were rendered amorphous by framing and placing in a press preheated to 400° C. for 135 sec. FIG. 10C and 11 show how LaRC-CPI films became amorphous after heating at 400° C.

8.2 Effect of Annealing Time on Properties

Stretching trials were first conducted with amorphous films using the hot shoe. Results of these experiments were then translated to the web stretcher. Using amorphous film on the hot shoe, it was possible to stretch fully imidized LARC-CPI-BTDA at relatively low temperatures. FIG. 20 provides some insight into the relationship between draw ratio and stretch temperature determined for amorphous film on the hot shoe apparatus. The Tg of the amorphous film is approximately 222° C.

Subsequent effort was directed toward stretching fully imidized amorphous film both on the web stretcher and the T.M. Long stretcher. Table XII presents the results of some of these experiments on the properties of LARC-CPI-BTDA film.

The tensile properties of fully amorphous, unoriented LARC-CPI are shown in the table as the control specimen. Increasing the draw ratio (e.g., to 3.0×) results in a direct increase in overall property levels. Examining the 3.0× draw ratio data, it is evident that annealing for 1 hr in air results in considerable improvements in strength and modulus with essentially no change to elongation. This is as a direct result of crystallinity enhancement. Increasing the annealing time from 1 hr to 4 hr results in no improvement whatsoever in mechanical properties (and possibly a small decline in them which is associated with molecular relaxation in the specimen). The same trend is evident in the data taken at 2.4×, where the effect of increasing annealing time after stretching from 1 to 2 hr produces no increase in properties.

TABLE XII
PROPERTIES OF AMORPHOUS AND ANNEALED AMORPHOUS LaRC-CPI-BTDA FILMS

| Processing Data Stretch Ratio | Tensile Web/Long Stretcher | Property Data Stretcher Temp. (°C.) | Stretch Condit. | Anneal Condit. | TS (Ksi) | TM (Ksi) | Elong. (%) |
|---|---|---|---|---|---|---|---|
| Control (x) | — | — | — | — | 17.4 | 400 | 15.5 |
| 2.4x Uni | Web | 215 | 280° C. (1 hr) | | 28.9 | 840 | 11.3 |
| 2.4x Uni | Web | 215 | 280° C. (2 hr) | | 26.2 | 770 | 10.1 |
| 3.0x Uni | Web | 235 | unannealed | | 32.78 | 820 | 12.8 |
| 3.0x Uni | Web | 235 | 300° C. (1 hr) | | 36.7 | 1080 | 11.0 |
| 3.0x Uni | Web | 235 | 300° C. (4 hr) | | 35.0 | 1030 | 11.9 |

It should be noted that these amorphous films show a considerable sensitivity to heating rate during annealing. This sensitivity is most evident in two temperature regimes—near the Tg and near the recrystallization temperature of 265° C. In both cases, too rapid a heating rate (i.e., directly introducing the room temperature film into a 265° C. environment) can lead to film breaking in the tentering frame. It was found that controlling the rate of film heatup considerably improves successful film production. The tendency to fracture near the glass transition temperature may be due to minor variations in heating of the specimen, so that some sections are above Tg and others are below, leading to regions of high stress. Facture at or near the recrystallization temperature on the other hand is most probably associated with restraining forces exerted by the frame on the film as the film volume is reduced upon crystallization. These time-temperature effects can be reduced by carefully monitoring the rate and homogeneity of heating as the specimen is heated to the annealing temperature.

The present invention has been described in detail, including the preferred embodiments thereof. However, it will be appreciated that those skilled in the art, upon consideration of the present disclosure may make modifications, and/or improvements in this invention and still be within the scope and spirit of this invention.

What is claimed is:

1. A film comprising uniaxially oriented imidized LaRC-CPI-BTDA polyimide having a tensile modulus greater than about 0.5 to 2.0 msi and tensile strength greater than about 40 to 80 ksi.

2. A film comprising biaxially oriented LaRC-CPI-BTDA having a tensile modulus of greater than about 0.5 to 2.0 msi and tensile strength greater than about 20 to 60 ksi.

3. An oriented film comprising semicrystalline thermoplastic polymer, the film produced by a method comprising:
   (a) partially crystallizing a film comprising semicrystalline thermoplastic polymer or precursor thereof by thermal treatment;
   (b) cooling the film of step (a) under conditions to inhibit further crystallization;
   (c) orienting the film of step (b) at a temperature slightly above the Tg; and
   (d) further crystallizing the film of step (c) by thermal treatment.

4. An oriented film comprising semicrystalline thermoplastic polymer, the film produced by a method comprising:
   (a) heating a film comprising semicrystalline thermoplastic polymer above the melting temperature to render the film amorphous
   (b) cooling the film of step (a) under conditions to keep the film amorphous;
   (c) orienting the film of step (b) at a temperature slightly above the Tg; and
   (d) heating the film of step (c) to crystallize the polymer.

5. The film of claims 3 or 4, wherein the semicrystalline thermoplastic polymer comprises polyimide.

6. The film of claim 5, wherein the polyimide comprises LaRC-CPI polyimide.

7. The film of claim 6, wherein the LaRC-CPI polyimide comprises LaRC-CPI-BTDA, LaRC-CPI-ODPA, or LaRC-CPI-s-BPDA.

8. An oriented film comprising fully imidized semicrystalline polyimide polymer, the film produced by a method comprising:
   (a) partially imidizing a film comprising polyamic acid precursor polymers by thermal treatment;
   (b) cooling the film of step (a) under conditions to inhibit further imidization;

(c) orienting the film of step (b) at a temperature slightly above the Tg; and (d) further imidizing the film of step (c) by thermal treatment.

9. The film of claim 8, wherein the polymer is a LaRC-CPI polyimide.

10. The film of claim 9, wherein the LaRC-CPI polymer is LaRC-CPI-BTDA, LaRC-CPI-ODPA or LaRC-CPI-s-BPDA.

11. The film of claim 8, wherein step (a) is carried out at from about 190° to 275° C., step (b) is carried out at room temperature, step (c) is carried out at about 5° C. or less above the temperature of step (a), and step (d) is carried out at about 275° to 375° C.

12. The film of claim 8, wherein step (a) is carried out at about 225° C., step (b) is carried out at room temperature, step (c) is carried out at about 5° C. or less above the temperature of step (a), and step (d) is carried out at about 300° C.

13. An oriented film comprising semicrystalline fully imidized polyimide, the film produced by a method comprising:
(a) heating a film comprising semicrystalline, fully imidized polyimide above the melting temperature;
(b) cooling the film obtained in step (a) under conditions to render it amorphous;
(c) orienting the film of step (b) at just above the Tg; and
(d) heating the film of step (c) below the melting point of the polyimide to crystallize the polymer.

14. An oriented film comprising semicrystalline, fully imidized LaRC-CPI-BTDA polymer, the film produced by a method comprising:
(a) heating a film comprising semicrystalline, fully imidized, LARC-CPI-BTDA polymer at about 375° C. to 400° C. for about one minute;
(b) cooling the film in air under conditions to render it amorphous;
(c) orienting the film of step (b) at a temperature just above the Tg; and
(d) heating the film of step (c) at about 300° C. to crystallize the polymer.

* * * * *